US012170879B2

(12) United States Patent
Lyren et al.

(10) Patent No.: US 12,170,879 B2
(45) Date of Patent: Dec. 17, 2024

(54) SWITCHING BINAURAL SOUND

(71) Applicants: Philip Scott Lyren, Rincon, PR (US); Glen A. Norris, Lakewood, OH (US)

(72) Inventors: Philip Scott Lyren, Rincon, PR (US); Glen A. Norris, Lakewood, OH (US)

( * ) Notice: Subject to any disclaimer, the term of this patent is extended or adjusted under 35 U.S.C. 154(b) by 0 days.

(21) Appl. No.: 18/234,931

(22) Filed: Aug. 17, 2023

(65) Prior Publication Data

US 2023/0396945 A1 Dec. 7, 2023

Related U.S. Application Data

(63) Continuation of application No. 17/898,600, filed on Aug. 30, 2022, now Pat. No. 11,736,880, which is a continuation of application No. 17/128,191, filed on Dec. 20, 2020, now abandoned, which is a continuation of application No. 16/896,251, filed on Jun. 9, 2020, now Pat. No. 10,873,821, which is a continuation of application No. 16/843,987, filed on Apr. 9, 2020, now Pat. No. 10,708,703, which is a continuation of application No. 16/695,104, filed on Nov. 25, 2019, now Pat. No. 10,659,898, which is a continuation of application No. 16/558,080, filed on Aug. 31, 2019, now Pat. No. 10,499,174, which is a continuation of application No. 16/510,921, filed on Jul. 14, 2019, now Pat. No. 10,440,490, which is a continuation of application No. 16/442,509, filed on Jun. 16, 2019, now Pat. No. 10,448,184, which is a continuation of application No. 16/435,503, filed on Jun. 9, 2019, now Pat. No. 10,412,519, said application No. 16/401,242 is a continuation of application No. 16/401,233, filed on May 2, 2019, now Pat. No. 10,362,421, said application No. 16/435,503 is a continuation of application No. 16/401,242, filed on May 2, 2019, now Pat. No. 10,368,179, said application No. 16/401,233 is a continuation of application No. 16/106,140, filed on Aug. 21, 2018, now Pat. No. 10,499,173, which is a (Continued)

(51) Int. Cl.

| | |
|---|---|
| ***H04S 1/00*** | (2006.01) |
| ***G10L 19/16*** | (2013.01) |
| ***G10L 19/22*** | (2013.01) |
| ***H04R 5/04*** | (2006.01) |
| ***H04S 7/00*** | (2006.01) |

(52) U.S. Cl.

CPC ........... *H04S 1/007* (2013.01); *G10L 19/167* (2013.01); *G10L 19/22* (2013.01); *H04R 5/04* (2013.01); *H04S 7/30* (2013.01); *H04S 7/302* (2013.01); *H04S 7/305* (2013.01); *H04S 2420/01* (2013.01)

(58) Field of Classification Search

None

See application file for complete search history.

(56) References Cited

U.S. PATENT DOCUMENTS

| | | | | |
|---|---|---|---|---|
| 10,055,887 B1 * | 8/2018 | Gil | G06F 1/163 | |
| 2005/0063549 A1 * | 3/2005 | Silvestri | H04R 1/10 | 381/1 |

(Continued)

*Primary Examiner* — Paul W Huber

(57) ABSTRACT

A method provides binaural sound to a person through electronic earphones. The binaural sound localizes to a sound localization point (SLP) in empty space that is away from but proximate to the person. When an event occurs, the binaural sound switches or changes to stereo sound, to mono sound, or to altered binaural sound.

17 Claims, 14 Drawing Sheets

Related U.S. Application Data continuation of application No. 15/826,721, filed on Nov. 30, 2017, now Pat. No. 10,080,093, which is a continuation of application No. 15/674,009, filed on Aug. 10, 2017, now Pat. No. 9,848,271, which is a continuation of application No. 14/979,483, filed on Dec. 27, 2015, now Pat. No. 9,749,766.

(56) References Cited

U.S. PATENT DOCUMENTS

| | | | | |
|---|---|---|---|---|
| 2013/0339850 | A1* | 12/2013 | Hardi | G11B 27/105<br>715/702 |
| 2014/0270200 | A1* | 9/2014 | Usher | G10L 25/78<br>381/74 |
| 2017/0098453 | A1* | 4/2017 | Wright | G06F 3/017 |

* cited by examiner

SWITCHING BINAURAL SOUND

BACKGROUND

Electronic devices typically provide monophonic or stereophonic sound to listeners. This sound has good speech intelligibility but does not provide the listeners with an ability to localize sources of the sound to places in their space.

Advancements in localizing sound will assist people in communicating with each other and with electronic devices.

SUMMARY OF THE INVENTION

Figure 1:
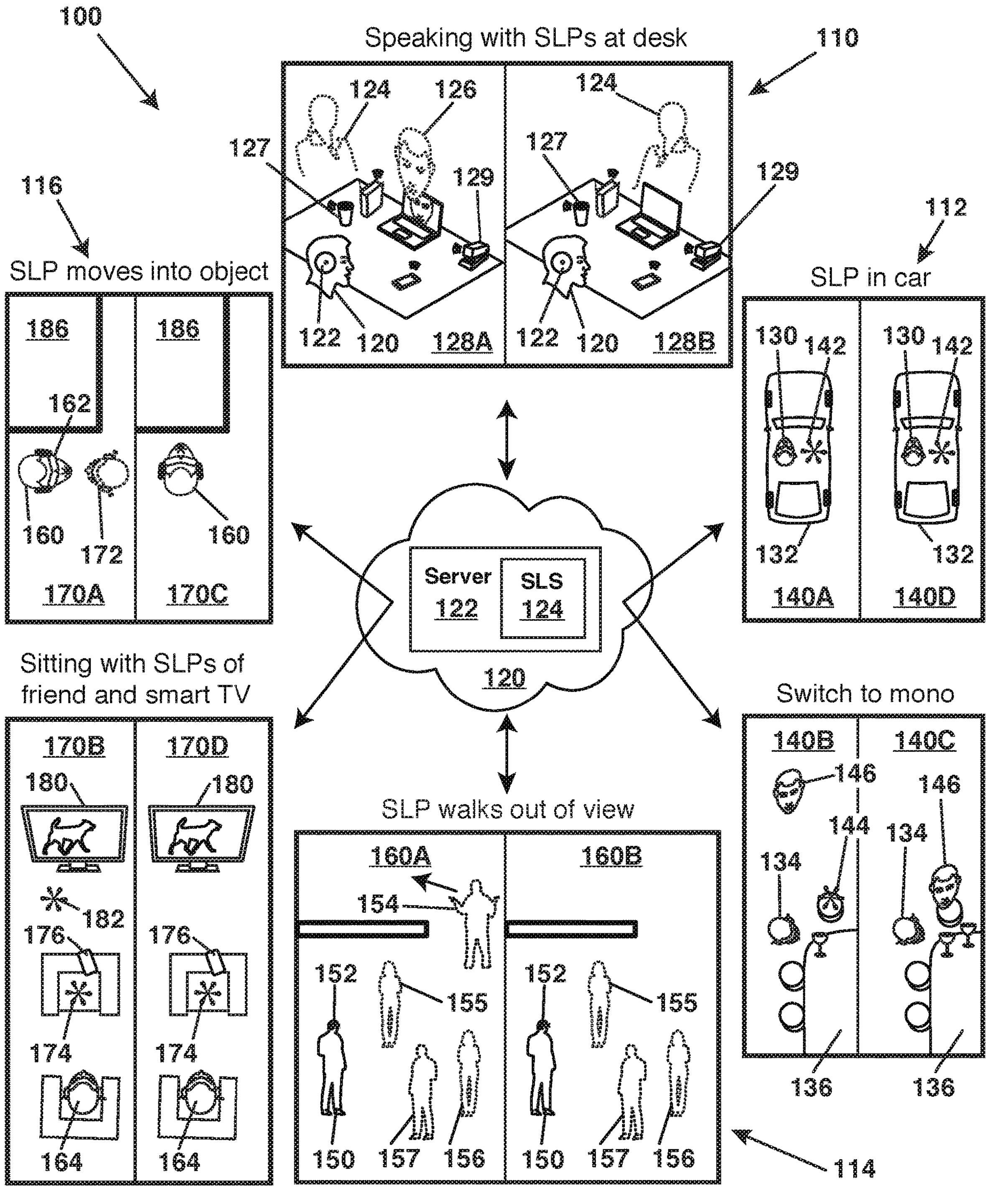
FIG. 1 is a computer system in accordance with an example embodiment.

One example embodiment is a method that provides binaural sound to a person through electronic earphones. The binaural sound localizes to a sound localization point (SLP) in empty space that is away from but proximate to the person. When an event occurs, the binaural sound switches or changes to stereo sound, to mono sound, or to altered binaural sound.

Other example embodiments are discussed herein.

DETAILED DESCRIPTION

Example embodiments include systems, apparatus, and methods that change binaural sound in response to an event. When the event occurs, binaural sound changes, such as switching to stereo sound, switching to mono sound, switching to altered binaural sound, removing or changing a sound localization point (SLP), moving a SLP (such as moving the SLP from being externally localized to being internally localized), or taking another action in accordance with an example embodiment.

By way of introduction, sound localization (i.e., the act of relating attributes of the sound being heard by the listener to the location of an auditory event) provides the listener with a three-dimensional (3D) soundscape or 3D sound environment where sounds can be localized to points around the listener. Binaural sound and some forms of stereo sound provide a listener with the ability to localize sound, though binaural sound generally provides a listener with a superior ability to localize sounds in the 3D environment.

Sound localization offers people a wealth of new technological avenues to not only communicate with each other but also to communicate with electronic devices, software programs, and processes. This technology has endless applications in augmented reality (AR), virtual reality (VR), audio augmented reality (AAR), telecommunications and communications, entertainment, tools and services for security, disabled persons, recording industry, education, natural language interfaces, and a host of other applications.

As this technology develops, challenges will arise with regard to how sound localization integrates into the modern era. Example embodiments offer solutions to some of these challenges and others regarding sound localization.

Binaural sound can be manufactured or recorded. When binaural sound is recorded, two microphones are placed as if they were in human ears (e.g., microphones placed on a dummy head) or actually positioned in, on, or near human ears. When this binaural recording is played back (e.g., through headphones or earphones), with intact the aspects known as human audial cues that provide a listener with an audio representation of the 3D space where the recording was made, the sound is extremely realistic. In fact, a listener can localize sources of individual sounds with a high degree of accuracy.

Binaural sound offers good sound localization since binaural recordings or binaural manufactured sound account for small differences to sound that arrives at one ear compared to sound that arrives at the other ear. These differences arise from factors that include the spacing between your ears, the shape of your head and torso, and the shape of your ears.

Binaural sound typically accounts for two types of localization cues: temporal cues and spectral cues. Temporary cues arise from an interaural time difference (ITD) due to spacing between the ears. Spectral cues arise from an interaural level difference (ILD) due to shadowing of sound around the head. Spatial cues are ITDs and ILDs or head-related-transfer-functions (HRTFs).

When binaural sound is played through traditional stereo speakers, the sound that the listener hears lacks spatial cues for sound localization when compared to binaural sound that the listener hears through headphones. Sound from stereo speakers can provide sound localization for binaural sound if the speakers provide a sweet spot through cross-talk cancellation.

One problem with binaural sound is that sounds can be internalized sounds or sounds having inside-the-head locatedness (IHL). IHL occurs when a sound appears to originate or emanate from inside the head of the person. One instance where IHL occurs is when a perceived distance to an origin of the sound is less than a radius of the head. IHL is undesired when the intent is to have the listener localize the sound to a point or location that is external to the head or to an externalized location. In other instances, IHL is desired (such as when a SLP is intentionally changed from being externally localized to being internally localized).

In some instances, a listener can externalize and localize a virtual source of binaural sound to a point as being indistinguishable from a real-world sound source at the virtual point. This can occur, for example, when the HRTFs are individualized or known for the listener (as opposed to being approximated or estimated; though such HRTFs can also be quite effective).

As explained in WIKIPEDIA, the term "binaural sound" and "stereo sound" are frequently confused as synonyms. Conventional stereo recordings do not factor in natural ear spacing or "head shadow" of the head and ears since these things happen naturally as a person listens and generates his or her own ITDs (interaural time differences) and ILDs (interaural level differences). Because loudspeaker-crosstalk of conventional stereo interferes with binaural reproduction, playback systems often use headphones or loud speakers that implement crosstalk cancellation. As a general rule, binaural sound accommodates for or is derived from one or more ITDs, ILDs, HRTFs, natural ear spacing, and head shadow. Binaural sound can also be explained as causing or intending to cause one or more sound sources produced through headphones or earphones as originating apart from but proximate to the listener.

Binaural sound spatialization can be reproduced to a listener using headphones or speakers, such as with dipole stereo (e.g., multiple speakers that execute crosstalk cancellation). Generally, binaural playback on earphones or a specially designed stereo system provides the listener with a sound that spatially exceeds normally recorded stereo sound since the binaural sound more accurately reproduces the natural sound a user hears if at the location of the sound. Binaural recordings can convincingly reproduce location of sound behind, ahead, above, or wherever else the sound actually came from during recording.

In an example embodiment, switching from binaural sound or altering binaural sound and/or a SLP occurs so that the user is unable to perceive externalization of one or more SLPs or audio cues. This prevents, inhibits, reduces, or encumbers the user from externally localizing sound or a portion thereof.

Example embodiments include a variety of different methods and apparatus to switch or change binaural sound and/or a SLP. By way of example, binaural sound changes to stereo sound or mono sound. As another example, one or more externalizations are canceled, disabled, moved, or changed. As another example, sound to one or more channels is canceled or paused (such as removing sound provided to a left ear or to a right ear). Other examples of changing binaural sound are discussed herein.

Consider an example embodiment that changes the sound output that a user receives to his ears from binaural sound to another form that is completely intelligible, but does not cause him to experience externalization of a sound. For example, adjustments are made to all (or less than all) signals in a multichannel audio stream or to individual sources or SLPs within the audio. For instance, a sound localization system (SLS) delivers binaural sound to a listener via a binaural sound stream that includes four musical instruments playing in unison at four different respective SLPs. The SLS can switch the entire audio stream to mono or stereo sound. Alternatively, the SLS can switch to delivering a modified binaural sound stream in which a listener continues to perceive the four instruments in unison, but only three of the instruments localize at their respective SLPs. A sound of the fourth instrument is presented equally in both ears; intelligibly, but not at a SLP but as being non-localized internalized sound. Thus, switching or changing binaural sound includes modifying the binaural sound or a SLP of the binaural sound.

Another method to switch or change binaural sound is to deliver one channel of sound, monophonic sound, either to both ears or to one ear. Monophonic sound can be derived from binaural sound in many ways such as at the output side, delivering one binaural channel to one or to both ears, and not delivering the other binaural channel. For example, binaural sound switches to mono sound by triggering an analog relay or digital switch that disconnects the left (or the right) channel output circuit. Alternatively, the switch occurs by instructing the listener to displace one of his headphone speakers from his ear. Another way to convert the binaural sound to mono sound is to combine the left signal with the right signal additively and then reduce (e.g., by half) the amplitude of the sum of the signals before or upon delivering the sound to the listener. In these situations, the binaural format source audio can remain unchanged for storage or binaural delivery to another listener. Furthermore, one of the binaural channels can be disconnected from the input side. For example, this disconnect occurs when an analog relay or digital switch disconnects the left (or the right) channel microphone (mic) input circuit.

The methods discussed herein to switch or change sound also apply analogously as methods for delivering stereo sounds to a listener as monophonic sounds.

Another way to deliver binaural sound to a listener while preventing the listener from experiencing sound localization is to deliver the sound via speakers located in such a configuration that the listener cannot listen at any point where there is no channel crosstalk (i.e. preventing a sweet spot or preventing him from locating himself at a sweet spot).

Another way to change binaural sound into mono sound, stereo sound, or non-binaural (i.e., sound that is not binaural sound or not fully binaural sound) is to prevent the listener from experiencing external localization or externalization. For example, the system processes two binaural channels through an appropriate lossy codec, such as one used for sound transmission including multiple Voice over Internet Protocol (VoIP) codecs. This process removes or corrupts the human audio cues in the binaural sound. For instance, a full-duplex or half-duplex codec passes voice information but strips, removes, or filters background noise/sound and the audio cues in the signals to give sufficient audio information about any of room size and shape, a listener's proximity to objects in the room, the location of any non-voice audio sources, and the location of any voice audio sources. For example, a digital signal processor (DSP) passes the intelligible sound of voices in a voice exchange but filters their human audio cues and/or other sounds.

Another way to switch a binaural sound into a stereophonic sound is to partially blend aspects of each of the two signals into each other. Alternatively, the system introduces crossfeed with parameters that destroy, nullify, or degrade audio cues necessary for external localization. At the same time, this crossfeed allows each channel to maintain some uniqueness so the listener still perceives an internalized soundstage, which the listener may find more pleasant than monophonic sound. By way of example, crossfeed is introduced by an analog circuit or by a DSP and activated by a hardware switch or a DSP.

An example embodiment uses a DSP or other processor to filter the binaural sound and degrade, alter, or eliminate sufficient audio cues to prevent a listener from experiencing external localization from a binaural audio source. For example, after DSP processing, the user perceives the sound with less, little, or no external localization. For example, a DSP process removes or re-normalizes interaural time differences (ITDs) in source impulses to cause imprecise or zero azimuth angle perception.

Another way of changing a sound from being perceived as binaurally captured audio or binaurally manufactured audio to being perceived as non-binaural audio is to render the original source with different spatial parameters or to re-render a sound source with different spatial parameters in order to adjust, degrade, or eliminate certain human audio cues. For example, a SLS renders a source sound using an HRTF to adjust SLPs, renders the sound source to specific alterations per an ITD and/or interaural level difference (ILD), or discontinues rendering or using the HRTF or ITD/ILD calculations while continuing to render other aspects of the audio without pause. As another example, a SLS continues rendering, without pause, and sets the spatial coordinates of any or all SLPs to points within a radius of a head of a listener or to points within a cone of confusion of a listener, in his medial plane, or directly above his head. As another example, the parameters of a rendering process can be set to "zero out" one or more dimension's coordinates input to the rendering algorithm in order to "flatten" the output by one or more dimensions.

Consider an example in which headphones deliver binaural sound to a listener. An event occurs and sound delivered to the headphones switches from being provided to the listener in binaural sound to being provided to the listener in stereo sound or in mono sound. As another example, when the event occurs, sound to one of the speakers in the headphone (such as sound originating from either the left speaker or the right speaker) is switched off or switched to stereo. For instance, the left speaker is switched off or muted, and the right speaker continues to provide sound to the listener. Alternatively, the right speaker is switched off or muted, and the left speaker continues to provide sound to the listener.

FIG. 1 is a computer system 100 with example scenarios (110, 112, 114, and 116) of changing binaural sound in accordance with an example embodiment. Communication occurs over one or more networks 120 and one or more servers 122 with a sound localization system 124.

In scenario 110, a user 120 wears electronic earphones 122 while simultaneously localizing a voice of an intelligent personal assistant (IPA) to a first sound localization point 124 and a voice of a friend to a second sound localization point 126. As shown in box 128A, the user 120 localizes the voice of the IPA to his left and localizes the voice of his friend in front of himself and above his laptop computer that is situated on his desk. An image of the friend appears on a display of the laptop while the SLP 126 appears above the laptop. As shown in the transition from box 128A to box 128B, the user 120 stops externally localizing a voice of his friend, and the sound localization point 126 disappears. When the call ends, the system changes the sound localization point 124 of the IPA and automatically moves it to be in front of the user 120. A voice of the friend switches to mono or stereo or gets localized internally to the user 120.

In scenario 110, the user 120 externally localizes sounds to emanate from objects on the desk, such as designating cup 127 as a SLP and designating stapler 129 as another SLP.

In scenario 112, a user 130 drives a car 132 while talking to another user 134 who wears headphones with microphones and sits at a table 136. As shown in box 140A, user 130 localizes a voice of user 134 to a sound localization point 142 (indicated with an asterisk-like symbol) that is located in an empty passenger seat in the front of the car 132. As shown in box 140B, user 134 localizes a voice of user 130 to a sound localization point 144 (indicated with an asterisk-like symbol) on top of an empty chair. As shown in the transition from box 140B to box 140C, when a third person 146 enters and sits at the chair next to user 134, the system removes the sound localization point 144 since the third person 146 physically occupies the space where the sound localization point 144 existed. The third person 146 collides, interferes, or overlaps with the SLP 144. The system considers moving the SLP to be in front of the user 144 but this space is occupied (e.g., by a bartender). The system also considers moving the SLP to be on a right side of user 134, but this space is not congruent with a position of the SLP 142 in relation to user 130 (i.e., SLP 142 is on a right side of user 130, and positioning the SLP 144 on the right side of user 134 is not congruent with that location). As such, the system decides to switch the call to stereo. The user 134 continues to talk to user 130, but a voice of user 130 now switches to stereo and is provided to the user 134 through his earphones. As shown in box 140D, the user 130 continues to externally localize the voice of user 134 at the sound localization point 142 in the empty front passenger seat of the car 132.

In scenario 114, a user 150 wears an optical head mounted display (OHMD) 152 that simultaneously provides a plurality of sound localization points 154, 155, 156, and 157 during a conference call with four individuals (each individual being represented with a visual image and accompanying SLP). As such, the sound localization points 154-157 coincide with visual displays or images of people with whom the user 150 talks. As shown in the transition from box 160A to box 160B, sound localization point 154 (appearing as a visual image of person) walks through a door and out of view of the user 150. When this occurs, the SLS providing sound to the OHMD 152 switches the voice of the corresponding person to mono, and the system providing video to the OHMD 152 removes the accompanying visual image of the person from being displayed to the user 150.

In scenario 116, a user 160 wears electronic glasses 162 and talks to another user 164 who sits in a chair in his family room and wears a headphone with mics. As shown in box 170A, a voice of user 164 localizes to an area of a sound localization point 172 that appears as an image of a head of user 164. As shown in box 170B, voice of user 160 localizes to a sound localization point 174 (indicated with an asterisk-like symbol) that appears on an empty chair next to or with a handheld portable electronic device (HPED) 176. Sound from a smart appliance 180 (shown as a television) localizes to a sound localization point 182 (indicated with an asterisk-like symbol) that is between the user 164 and the smart appliance 180. As shown in the transition from box 170A to box 170C, when the user 160 turns his head toward wall 186, the sound localization point 172 and accompanying visualization of this point disappear. A voice of the user 164 switches to stereo or mono for the user 160 and plays through his electronic earphones. As shown in the transition from box 170B to box 170D, user 164 turns off external localization of the smart appliance 180, and sound from the smart appliance switches to stereo or mono (such as being provided through the speakers in the family room or through headphones that user 164 wears).

Figure 2:
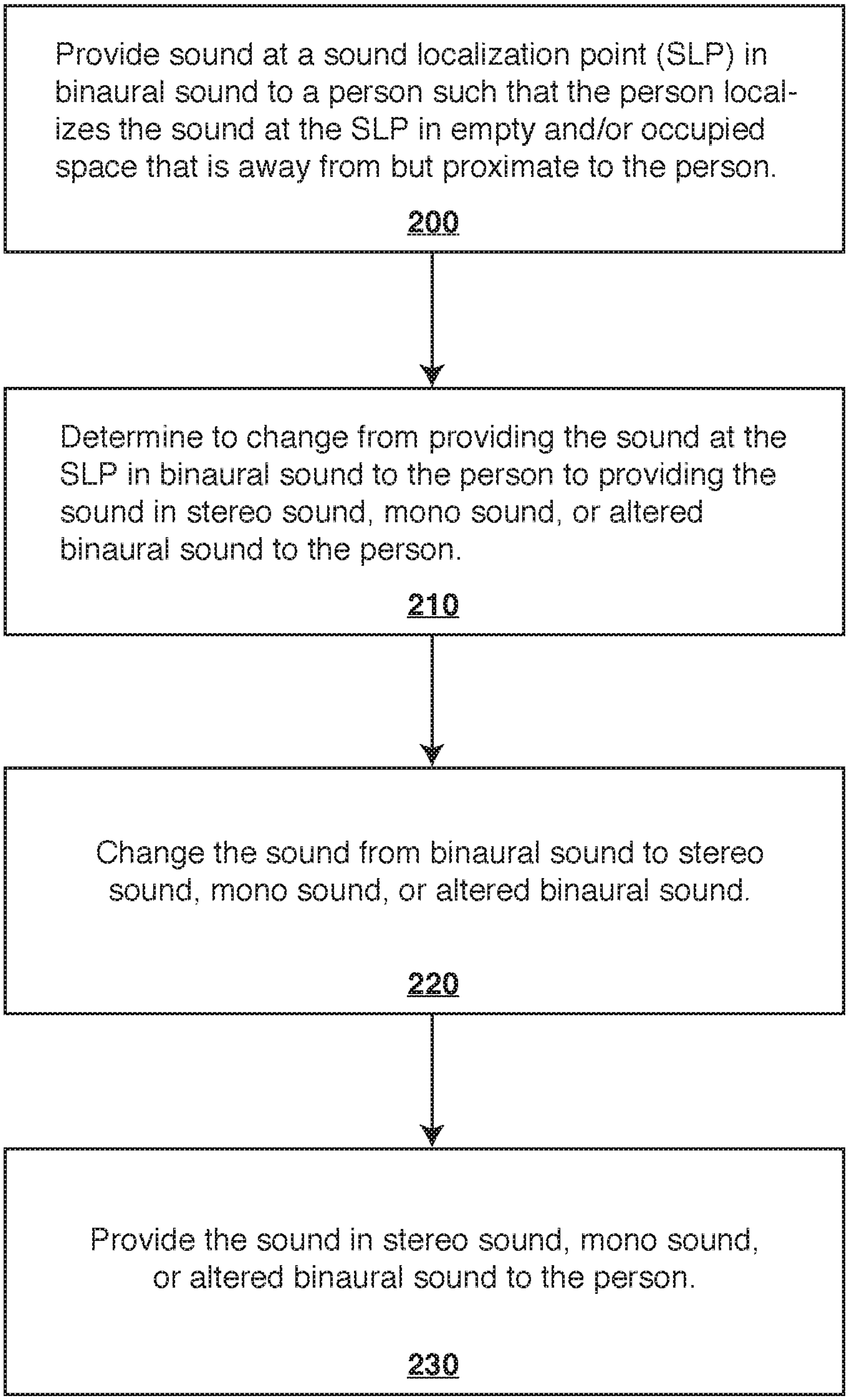
FIG. 2 is a method to change between providing sound at a sound localization point in binaural sound to a person to providing the sound in stereo sound, mono sound, or altered binaural sound to the person in accordance with an example embodiment.

FIG. 2 is a method to change between providing sound at a sound localization point in binaural sound to a person to providing the sound in stereo sound, mono sound, or altered binaural sound to the person.

Block 200 states provide sound at a sound localization point (SLP) in binaural sound to a person such that the person localizes the sound at the SLP in empty and/or occupied space that is away from but proximate to the person.

In an example embodiment, speakers provide binaural sound to the person such that the sound localizes in empty and/or occupied space that are proximate to but away from the person. For example, these speakers are located in electronic earphones that the person wears, on electronic glasses that the person wears, and/or in a room in which the user is located. For instance, a sound system with external speakers provides one or more sweet spots or SLPs where a user can physically stand, sit, or lie and receive binaural sound without noise or cross-talk such that the user perceives one or more sound sources as being away from but proximate to the user. As another example, a listener perceives SLPs while listening to music or a voice and wearing electronic headphones or earphones.

The binaural sound can include one or more SLPs for the sound, and these SLPs can localize to different points or areas with respect to the person. These areas or points can be internal and/or external SLPs. For example, a first sound or voice externally localizes to a first SLP; a second sound or voice internally localizes to a second SLP; a third sound or voice externally localizes to a third SLP; etc.

Each SLP can be separate and distinct points, areas, or locations in empty space or occupied space (including internal space inside the head of the listener). For example, the first sound or voice localizes to a first SLP that is a point in empty space proximate to but away from the person; the second sound or voice localizes to a second SLP that is an object (i.e., a physical thing that occupies a space) proximate to but away from the person; and the third sound or voice localizes inside the head of the person. The first, second, and third SLPs are located at different places with respect to the person. For instance, the first SLP is five feet from the ground and two feet in front of a face of the person, and the second SLP is at a teddy bear sitting on the floor next to the feet of the person.

SLPs can take a form of points, lines, areas, or volumes of any shape. They can be fixed, or they can move about in a reference frame of a listener. For example, a SLP can be motionless, or it can dynamically change its orientation, location, and/or shape. For instance, a SLP positioned on a table and in a shape of a parabolic dish facing a listener can be animated to rotate in place to face away from the listener. This SLP can dynamically morph into the shape of a 2D panel and/or can be animated to move from the table to a nearby window while changing shape to a point. SLPs can be static or unchanging or dynamic in size, shape, location, orientation, acoustic properties, and other aspects (e.g., changing continuously, continually, periodically, instantly, or systematically over time or during an event). For instance, a static SLP can change to being dynamic or change from being dynamic to being static. For example, a barking sound heretofore rendered as a static SLP with a shape and acoustic properties of a wooden loudspeaker box initially sits in the corner of a room, then approaches a listener, and transforms its shape and acoustic properties into those of a 50 kilogram furry barking dog.

Block 210 states determine to change from providing the sound at the SLP in binaural sound to the person to providing the sound in stereo sound, mono sound, or altered binaural sound to the person.

Consider an example in which the person listening to binaural or stereo sounds determines to switch the sound from binaural to stereo or from stereo to binaural. As another example, an intelligent personal assistant (IPA) or an intelligent user agent (IUA) determines to change a user's perceived sound from binaural to stereo or to mono. As another example, a software application executing on an electronic device (such as a laptop or handheld portable electronic device (HPED) of the person and a server in communication with the laptop or HPED) determines to change a user's perceived sound from binaural to mono or mono to binaural. As another example, a SLS or IPA determines to change binaural sound and alter or move one or more of its audio cues or SLPs.

A determination to change from providing the sound in binaural sound to providing the sound in altered binaural or in stereo or mono sounds (or from providing the sound in stereo or mono sounds to providing the sound in binaural sound) can be based on or in response to one or more events, such as data from an event (such as a sensed event) or data from a condition (such as a network condition). For example, an event can trigger or cause the switch to occur. For instance, the switch occurs or executes when the event is sensed, is processed, is received, is transmitted, is obtained, is executed, occurs, stops or ends, begins or commences, is perceived, is heard, etc.

Example embodiments can switch in response to or based on a wide variety of different types of events. Such events can be programmed, specified, or predetermined by one or more of an electronic device, a user, a person, a process, a computer, a computer system, software, hardware, an intelligent personal assistant, and a user agent (including machine learning agents and intelligent user agents). Further, rules associated with these events or a list or number of events can be static (such as to switch based on the occurrence of event 1, event 2, or event 3) or dynamic (such as to switch today based on the occurrence of event 1 or event 2, but switch tomorrow based on the occurrence of event 3 and event 4 simultaneously occurring).

Example embodiments are not limited to a specific type of an event or a specific time or duration of an event. As noted, such events can be dynamic or static and selected by one or more of a user, a person, apparatus or machine, method, etc. Examples of events and things that can trigger events include, but are not limited to, one or more of a time of day, a calendar day (such as a specific day of the week or day in a month), a location (such as a location of an electronic device or of a person listening to the sound), actions of a third person (such as a person walking into a room), a command or request from a person (such as a person interacting with a user interface to switch the sound), a command or request from a machine (such as a process, software program, intelligent user agent, or intelligent personal assistant commanding, requesting, initiating, or executing the switch), processing power (such as available processing power of an electronic device during a voice exchange or sound localization), bandwidth (such as available transmission and receiving wireless bandwidth of an electronic device during a voice exchange or sound localization), memory (such as available memory of an electronic device during a voice exchange or sound localization), position or movement or orientation of a person or head of the person (such as direction the person walks or head orientation of the person), distance from the person to an object (such as distance from the person to a wall or an obstruction), available space (such as how much physical 3D space is available to receive and/or localize a sound or voice), safety (such as not localizing sound when the person is driving a vehicle), proximity to or being at a restricted area (such as state, local, or United States Federal regulations prohibiting externally localizing sound while in a certain building or on an airplane), time (such as to switch the sound after a predetermined or given amount of time), a person's identity in a communication (such as to switch a call from binaural sound to stereo when a certain person calls using voice-over internet protocol, VoIP), and other examples provided herein.

Block 220 states change the sound from binaural sound to stereo sound, mono sound, or altered binaural sound.

The sound changes from being provided in binaural sound to being provided in stereo sound, mono sound, or altered binaural sound. Alternatively, the sound changes from being provided in stereo sound or mono sound to being provided in binaural sound. Sound can switch back and forth from being provided in binaural, stereo, and mono sounds (including switching between different variations of binaural sound, such as binaural sounds having different SLPs, different volumes at SLPs, etc.).

The sound can be changed using hardware and/or software. Further, the electronic device or system that performs the switching can vary depending, for example, on the application or configuration of the computer system and/or electronic devices in the computer system. For instance, switching is performed or executed by one or more of an electronic earphone, speakers, a SLS, an HPED, a computer, a server, and an electronic device.

Consider an example in which an electronic device provides binaural sound to a listener such that the sound externally localizes to a SLP that is away from but proximate to the person. The electronic device switches or changes the binaural sound to localize to a SLP that is internal to the person (i.e., inside the head of the person).

Block 230 states provide the sound in stereo sound, mono sound, or altered binaural sound to the person.

Once the sound is changed from binaural sound to stereo sound, mono sound, or altered binaural sound, then the sound is provided to the person in the stereo sound, mono sound, or altered binaural sound. Alternatively, once the sound is changed from stereo sound or mono sound to binaural sound, then the sound is provided to the person in binaural sound. Further, switching can happen in real-time without interruption to the sound (such as without interrupting a voice exchange with an intelligent personal assistant or an electronic call between two or more people).

Consider an example in which a person wears earphones that wirelessly connect to an HPED. The person listens to a voice recording that externally localizes in binaural sound to a SLP that is three feet in front of his face. This SLP remains fixed at this distance from the person even as the person moves around. While listening to this recording, the person enters an elevator full of people. If the sound continued to localize at the SLP, then the voice appears to originate from another person in the elevator or from a wall in the elevator, and this confuses or frustrates the listening person. In response to this event of entering the elevator, the HPED automatically switches the sound of the recording so that the earphones present the sound of the voice recording in stereo sound when the listener enters the elevator. When the listener exits the elevator, the sound switches back to being presented in binaural sound such that the sound localizes to the SLP that is three feet in front of the face of the listener.

Consider an example in which a person is playing a game in a 3D rendered environment in which certain sounds are being localized to multiple SLPs through electronic headphones that the person wears. During this time, the headphones come off from the person, and the system senses that the headphones are removed and/or disconnected and automatically switches the sound to mono sound that emanates from his desktop computer speakers.

Consider an example in which a user listens to an audio drama that was recorded in binaural sound but is played in mono sound through car speakers while the user drives the car. Upon arriving at a destination, the person wants to continue listening to the audio drama, steps out of the car, and places headphones on his head. The system continues streaming the audio drama to the person uninterrupted by sending the stream to the headphones rather than to the car. At this time, the system knows the audio drama is a binaural signal and switches the audio drama to binaural sound as it transmits to and plays through the headphones of the person.

Consider an example in which a binaural streaming Internet channel convolves a mono source of sound to binaural sound before streaming the sound to a listener that hears the binaural sound through headphones that communicate with a tablet computer. An application executing on the tablet computer receives the streams and provides them to the tablet computer for output to the headphones. The listener disconnects his headphones from the tablet computer that has a single speaker. In response to this disconnection, the application continues to send the audio stream to the speaker of the tablet computer but also sends a protocol message to the streaming Internet channel requesting a switch to a mono-codec. In response to this protocol message, the streaming Internet channel accepts the request for the codec change and sends the mono source to the tablet computer without an interruption in the continuity of playback of the audio sound.

Consider another example in which Alice talks to Bob with mono sound during a VoIP call. The system determines that sufficient network bandwidth exists to upgrade the call to binaural sound and automatically switches the mono sound to binaural sound.

A SLP in empty space can include images or video (e.g., images that are part of an augmented or virtual reality). Consider an example in which Alice wears electronic glasses with a see-thru display, OHMD, or a head-mounted display. During a call with Bob, the system localizes a voice of Bob to a SLP in empty space that is proximate to but away from Alice. The electronic glasses or head-mounted display provides or displays an image of Bob that coincides with the SLP in empty space. The image appears to exist in space at the location in empty space with the SLP that is proximate to but away from Alice. Thus, the SLP of Bob's voice and the image of Bob exist in empty space at the same location that is proximate to but away from Alice. To Alice, the voice of Bob appears to emanate from the image of Bob.

Consider an example in which Alice watches a movie at home or in a theater and wears 3D glasses and electronic earphones that are in communication with her HPED (such as wired or wirelessly coupled to the HPED). Sounds from the movie are received by her HPED and localize to Alice at SLPs that are in empty space between her and the movie screen. These SLPs coincide with images from the movie as seen through her 3D glasses. Even though the SLPs are actually in empty space (i.e., occur between her and the movie screen where no physical, real objects exist), images from the movie appear to exist at the SLPs in empty space since the movie is in 3D and such images appear to project out of the movie screen.

A SLP point in empty space can also be void of images or video. Consider an example in which Alice wears electronic earphones that communicate with her HPED that is located in her purse. She receives a VoIP call from Bob. A sound of Bob's voice externally localizes to a SLP that is in front of Alice at a point or area in empty space that is void of any physical objects. Since Alice is not wearing any electronic glasses and cannot see a display, Bob's voice localizes to the SLP without an accompanying image.

Figure 3:
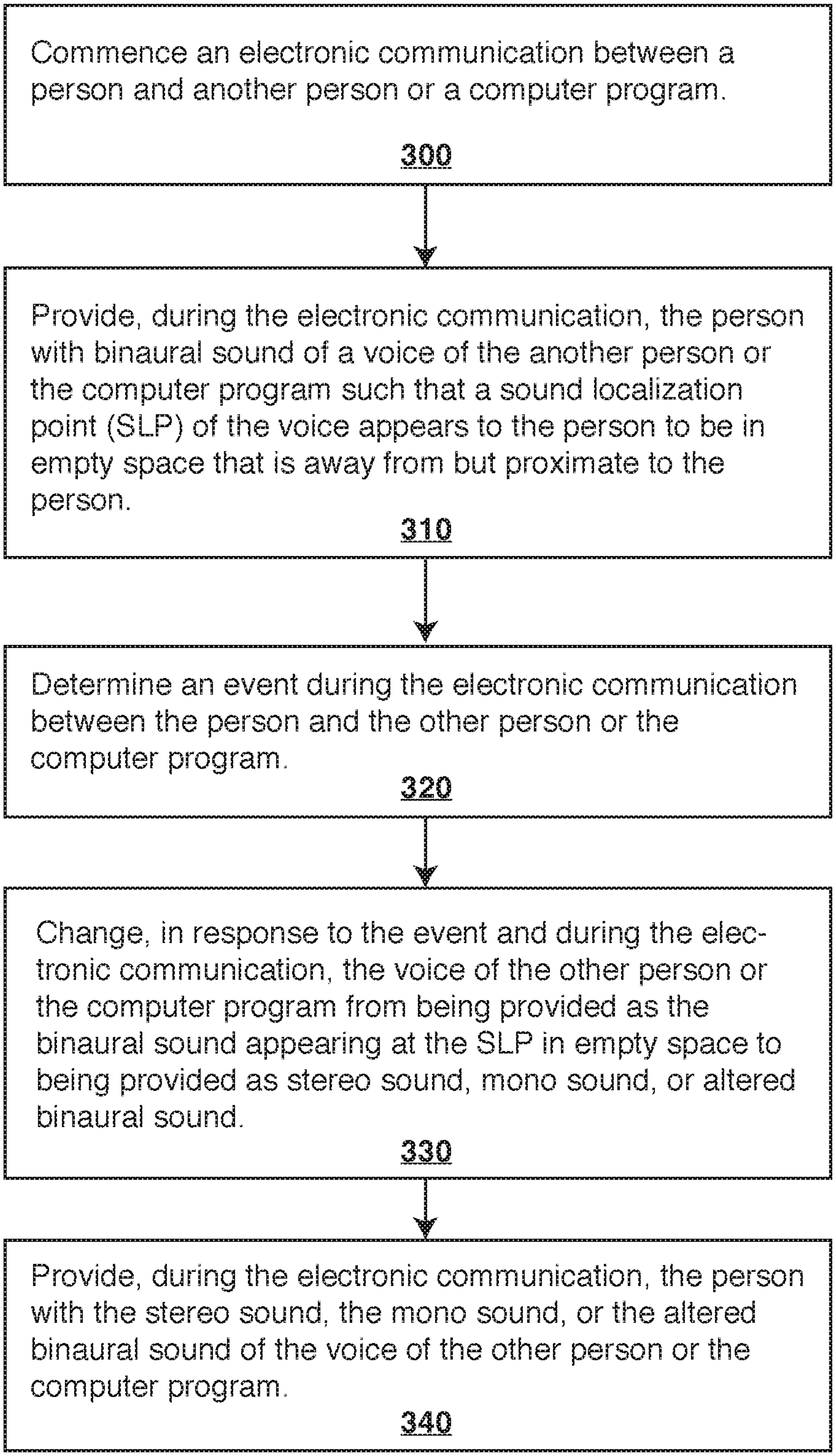
FIG. 3 is a method to change between providing sound at a sound localization point in binaural sound to a person to providing the sound in stereo sound, mono sound, or altered binaural sound to the person in accordance with an example embodiment.

FIG. 3 is a method to change between providing sound at a sound localization point in binaural sound to a person to providing the sound in stereo sound, mono sound, or altered binaural sound to the person.

Block 300 states commence an electronic communication between a person and another person or a computer program.

The electronic communication can exist between two or more people (i.e., humans) or between a person and a computer program (such as an intelligent user agent or an intelligent personal assistant). Alternatively, this communication can include multiple people and multiple computer programs (such as a user talking to several people on a Voice over Internet Protocol (VoIP) call while also simultaneously talking with an intelligent personal assistant over a different protocol.

Block 310 states provide, during the electronic communication, the person with binaural sound of a voice of the other person or the computer program such that a sound localization point (SLP) of the voice of appears to the person to be in empty space that is away from but proximate to the person.

The voice of the other person or the computer program externally localizes to a point or to an area (i.e., the SLP) that is proximate to the person. A sound of this voice appears to the person to originate from the SLP. Thus, from the point of view of the person, the sound of the voice originates at a distinct or specific point or location, which is the SLP for the voice.

The SLP can exist in empty or unoccupied space, such as appearing in front of the person, next to the person, above the person, below the person, etc. This empty space can include virtual images or images per an augmented reality, such as 2D or 3D images that appear through electronic glasses. Alternatively, the SLP can exist in non-empty or occupied space, such as appearing to emanate from a physical object or tangible thing. For example, sound localizes to a moving remote control car or a teddy bear sitting on a chair. Further yet, the SLP can be internally localized, such as appearing to originate at a location inside the head of the listener.

Block 320 states determine an event during the electronic communication between the person and the other person or the computer program.

By way of example, an electronic device or a person can determine the event, such as a sensor sensing movement, a person issuing a verbal command through a natural language user interface, or other events discussed herein.

Block 330 states change, in response to the event and during the electronic communication, the voice of the other person or the computer program from being provided as the binaural sound appearing at the SLP in empty space to being provided as stereo sound, mono sound, or altered binaural sound.

The event triggers or initiates a switch from binaural sound to stereo sound, from stereo sound to binaural sound, from binaural sound to mono sound, from mono sound to binaural sound, or from binaural sound to altered binaural sound. For example, a person receives binaural sound with a first codec, and a switch occurs such that the person receives binaural sound with a second codec. As another example, a person receives binaural sound rendered with a first set of HRTFs, and a switch occurs such that the person receives a second binaural sound rendered from a second set of HRTFs. As another example, a person receives binaural sound with a first set of SLPs, and a switch occurs such that the person receives binaural sound with a second set of SLPs. As yet another example, a person receives binaural sound with a first set of background sound, and a switch occurs such that the person receives binaural sound with a second set of background sound. A person can receive binaural sound corresponding to one virtual or real or augmented space, and a switch occurs such that the person receives binaural sound from a second virtual or real or augmented space. As yet another example, after an event is detected, a change to the original binaural sound occurs while still providing the listener with altered or changed binaural sound (such as changing one or more SLPs, ITDs, ILDs, HRTFs, etc. in the original binaural sound while still maintaining binaural sound).

Block 340 states provide, during the electronic communication, the person with the stereo sound, the mono sound, or the altered binaural sound of the voice of the other person or the computer program.

Consider an example in which Alice and Bob wear earphones with mics and talk to each other using a telephony application while they physically reside in different countries. Alice has prepaid for a twenty-minute binaural call. A voice of Bob localizes three feet in front of Alice, and a voice of Alice localizes three feet in from of Bob. After expiration of the twenty minutes, the sound of the call for Alice switches from binaural sound to stereo sound and continues uninterrupted. Alice notices the switch and is encouraged to subscribe to a monthly flat-fee for unlimited binaural calls. Later during the call, Alice removes her earphones from her head. An electronic device with Alice detects removal of the earphones and switches audio output for both Alice and Bob to mono. Bob's voice now emanates as mono from a speaker on Alice's HPED.

Consider further the example above of the telephony application call with Alice and Bob. During the call, Bob walks around his house while the voice of Alice localizes to a SLP three feet in front of his face. Bob walks toward a wall, and a switch to stereo or mono sound occurs when Bob's face is three feet or less from the wall. If this switch did not occur, then the voice of Alice appears to originate from inside or behind the wall from the point of view of Bob. Alternatively, this event triggers the sound localization system (SLS) to dampen the higher frequencies of Alice's voice so the sound of her voice appears to emanate from inside the wall. When Bob moves his face farther than three feet from the wall, a switch-back occurs and the normal voice of Alice once again localizes to being three feet in front of Bob's face.

Consider further the example above of the telephony application call with Alice and Bob. During the call, Alice receives another call from her friend Charlie, and she adds Charlie to this call, which is now a three-way call. Alice, however, has not subscribed to the telephony application's special feature that allows multiple binaural sound localizations, so her system is unable to simultaneously localize a voice of Charlie and a voice of Bob. She can continue with the call in which Charlie is provided as stereo or mono sound and Bob is provided as binaural sound, but her preference is not to have calls in this manner because she likes consistent sound localization. So, her system automatically switches the voice of Bob to mono sound on the left channel and includes the voice of Charlie in mono on the right channel. Alice continues the three-way call and hears the voices of Bob and Charlie as mono sound sources through her stereo earphones. Bob continues to hear the voices of both Alice and Charlie as binaural sounds that localize to areas near him since he has subscribed to the multiple binaural sound localizations feature.

Consider further the example above of the telephony application call with Alice and Bob in which binaural sound is altered. During the call, Alice hears the voice of Bob as binaural sound with the sound of waves crashing on a beach as a background. Alice decides that she does not want this background and switches to a speech-only binaural sound option. In this option, the voice of Bob continues to localize as binaural sound to Alice but the beach audio background is removed.

Consider further the example above of the telephony application call with Alice and Bob. During the call, Bob becomes uncomfortable hearing the voice of Alice localized near him. He voices a command to switch to stereo sound, and the voice of Alice immediately switches to being provided as stereo sound through Bob's earphones.

FIGS. 4-16 provide examples of events for changing sound from binaural sound to stereo sound, mono sound, or altered binaural sound. These examples can also be applicable for performing other types of switches or other types of action (such as switching sound from stereo or mono sound to binaural sound and performing other actions discussed herein).

Figure 4:
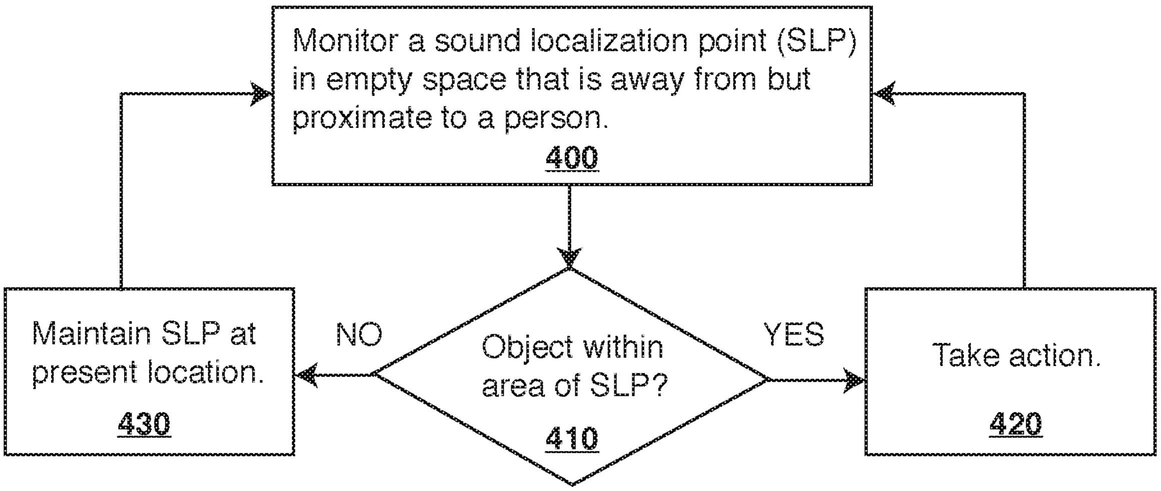
FIG. 4 is a method to monitor a sound localization point (SLP) and to take an action when an object is within the SLP in accordance with an example embodiment.

FIG. 4 is a method to monitor a sound localization point (SLP) and to take an action when an object is within the SLP.

Block 400 states monitor a sound localization point (SLP) in empty space that is away from but proximate to a person.

Block 410 makes a determination as to whether an object enters within an area of the SLP.

If the answer to the determination is "yes" then flow proceeds to block 420 that states take action.

If the answer to the determination is "no" then flow proceeds to block 430 that states maintain SLP at present location.

In FIGS. 4-16, example actions include, but are not limited to, one or more of switch the sound from binaural sound to stereo sound, switch the sound from binaural sound to mono sound, switch the sound from stereo sound to binaural sound, switch the sound from mono sound to binaural sound, maintain binaural sound but alter the binaural sound, stop binaural sound, discontinue playing sound, mute the sound, lower a volume of the sound, raise a volume of the sound, "cancel-out" or quiet a sound or part of a sound by processing it with Active Noise Control (ANC), provide a sound or audio alert, provide a visual alert, move one or more SLPs, adjust or alter a SLP, cancel a SLP, replace a SLP with a different SLP, replace a binaural environment with a different binaural environment, switch one or more codecs, cancel a command, execute a command or instruction, alter a HRTF of a person, change or alter an ITD or an ILD, end a computer program or process, start a computer program or process, provide a notification to a computer program or a person, and other actions discussed herein.

As discussed herein, an object is not limited to physical or tangible objects, but also includes intangible objects, such as sounds or images. For example, an event occurs when an electronic device detects a presence of a sound or an image.

Consider an example in which Alice localizes binaural sound of Bob's voice to a SLP that is away from but proximate to Alice, such as localizing Bob's voice to a point within three feet of a face of Alice. Charlie walks up to Alice and interferes with the SLP by entering within a predetermined area or zone of Alice. When Charlie enters this zone, an event occurs (i.e., Charlie's presence interferes with the SLP). For example, when Charlie comes within three feet of Alice, the voice of Bob that Alice hears switches from binaural sound to stereo or mono sound. As another example, when Charlie moves within or proximate to a zone or area of the SLP (i.e., location of Bob's voice), the voice of Bob that Alice hears switches from binaural sound localized three feet from Alice to binaural sound localized one foot from Alice.

Consider an example in which Alice talks to an intelligent personal assistant named Max. A voice of Max localizes several feet from Alice's face and remains at this location with respect to Alice's face even as she walks around. While talking to Max, Alice moves herself to be in front of a mirror. If the SLP of Max did not move, then the voice of Max appears to originate from the mirror or from the wall behind the mirror or from the visage of Alice in the mirror, and such localization confuses or disquiets Alice. The system automatically moves the SLP of Max in response to Alice moving in front of the mirror and repositions the SLP to one side of Alice such that the SLP now appears in empty or unoccupied space proximate to but away from a side of Alice.

An action can be taken when a non-physical object enters within an area of a SLP. Consider an example in which Alice listens to binaural sound with multiple different SLPs simultaneously providing sound from different perceived locations. A stranger walks near Alice and speaks. Microphones with Alice detect the speech, and a speech recognizer analyzes the voice of the stranger but does not recognize it. No action is taken as Alice continues to hear sound from and to communicate with the SLPs. Later, Bob (a friend of Alice) walks near her and says “Hello.” The voice recognizer recognizes Bob’s voice, and the system automatically mutes the SLPs since Bob is on a list as one of Alice’s friends.

Consider an example in which Alice’s dog wears a collar that communicates its position to Alice’s home area network (HAM). While Alice is parking her car at the house and listening to stereo music through the car’s stereo speakers, the dog runs near the car and is in danger of being hit. The car senses the location of the dog and generates a binaural sound. The system switches the stereo music to mono and lowers the volume of the music. The binaural sound alert is played on top of the music and alerts Alice of the presence of the dog. Alice hears this sound as a binaural sound since she is sitting in a sweet-spot at the driver’s seat. To Alice, the sound localizes outside of the car to where the dog is located.

Consider an example in which an electronic device is set to provide a SLP of a voice of an intelligent personal assistant three feet in front of a listener. The electronic device includes a sensor (such as a camera or other type of sensor) to determine a distance from the electronic device and/or the listener to an object. When the object is within a predetermined distance (such as being within three feet of the listener), then the electronic device takes an action with regard to the SLP, such as moving the SLP, removing the SLP, switching or changing to stereo or mono sound, etc. This action prevents the voice from appearing to originate or to emanate from the object when such is not the desire or intention of the listener.

A switch, change, or other action with regard to the SLP or the binaural sound can occur when the object conflicts, interferes (i.e., collides with, comes near, overlaps, touches, or hinders), overlaps, approaches, exists in, or exists near the person or a SLP of the person. Furthermore, a predictor can estimate or predict whether an object and an area or point of the SLP will overlap, coincide together, or otherwise exist as to be unwanted or undesired by the person.

Figure 5:
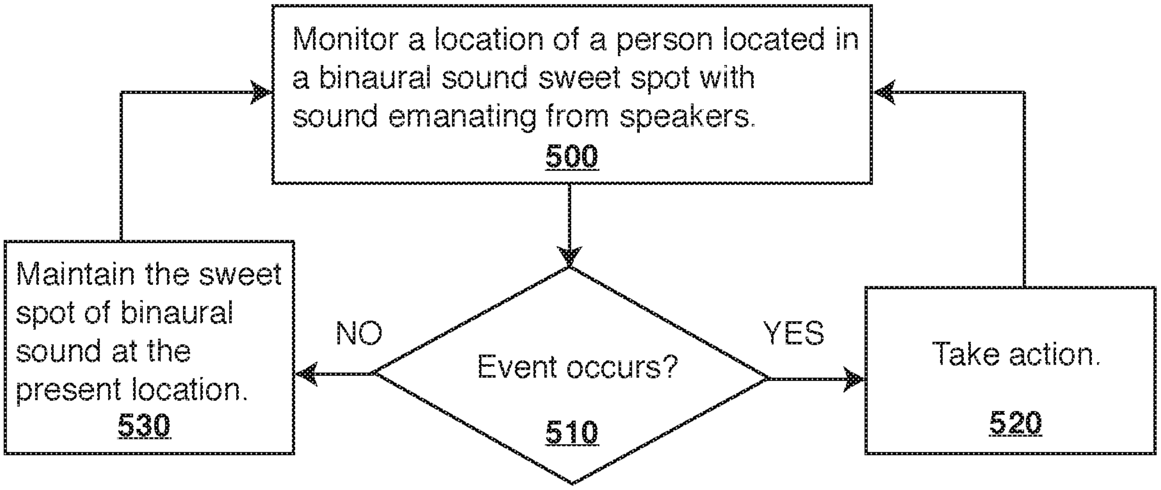
FIG. 5 is a method to monitor a location of a person in a sweet spot and to take an action when an event occurs in accordance with an example embodiment.

FIG. 5 is a method to monitor a location of a person in a sweet spot and to take an action when an event occurs.

Block 500 states monitor a location of a person located in a binaural sound sweet spot with sound emanating from speakers.

Block 510 makes a determination as to whether an event occurs.

If the answer to the determination is “yes” then flow proceeds to block 520 that states take action.

If the answer to the determination is “no” then flow proceeds to block 530 that states maintain the sweet spot of binaural sound at the present location.

Consider an example in which an electronic device monitors a position or location of a person using one or more of a camera, Global Positioning System (GPS), a scanner, a sensor or motion detector (such as a passive infrared sensor (PIR sensor), microwave sensor, an ultrasonic sensor, or a tomographic motion detection system), a wearable electronic device (WED) or a head mounted display, or an HPED. When the electronic device determines that the person moves away from or out of the sweet spot, then the speakers switch from providing binaural sound to providing the same sound with crossfeed. Alternatively, when the electronic device determines that the person moves away from or out of the sweet spot, then the sweet spot moves to follow or track the person so the person continues to hear binaural sound while moving away from the initial sweet spot. Alternatively, when the electronic device determines that the person moves away from or out of the sweet spot, then the music pauses.

Consider an example in which Alice sits in a sweet spot between two speakers listening to binaural music from her home music system. A motion detector/sensor in her HPED detects the event of another individual entering the room. Since the other person is not located at the sweet spot, this person can experience some irritating audio artifacts due to crosstalk. In response to this event, the HPED signals to the home music system to switch the music to mono sound. As another example, when a telephone rings, this event causes the home music system to lower the music volume and switch the sound to mono.

Figure 6:
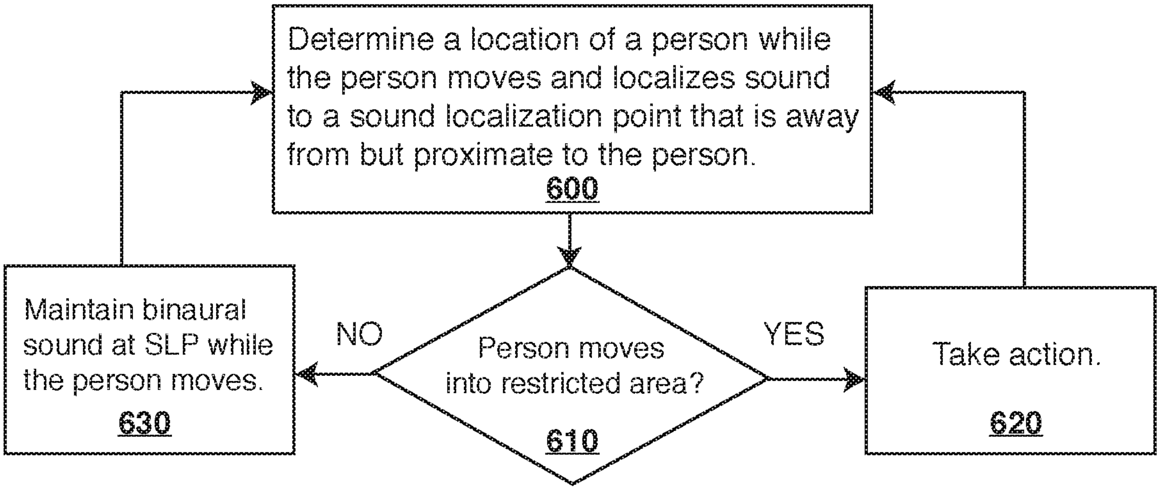
FIG. 6 is a method to determine a location of a person and to take an action when the person moves into a restricted area in accordance with an example embodiment.

FIG. 6 is a method to determine a location of a person and to take an action when the person moves into a restricted area.

Block 600 states determine a location of a person while the person moves and localizes sound to a sound localization point that is away from but proximate to the person.

Block 610 makes a determination as to whether the person moves into a restricted area.

If the answer to the determination is “yes” then flow proceeds to block 620 that states take action.

If the answer to the determination is “no” then flow proceeds to block 630 that states maintain binaural sound at SLP while the person moves.

Examples of restricted areas include, but are not limited to, an area, a location, or a point that prohibits SLPs or sound localization, an area in which it is dangerous to localize sound, a vehicle, or other location. Examples of such locations include at or near a construction zone or other inherently dangerous or hazardous area, inside an automobile, on a motorcycle or other motorized vehicle, in a library or a hospital or a sports arena or an elevator or a school or classroom, on a public transport (such as a bus, train, or airplane). Restricted areas can also include areas where a person or object is located or areas where another SLP is located. Restricted areas further include areas that are too small or confined so that the area impedes, limits, or restricts a SLP or external localization of sound.

Consider an example in which Alice wears earphones and localizes a voice of Bob in front of her during a phone call. While talking to Bob, Alice gets into her car and begins to drive. The state where Alice is located, however, prohibits drivers from localizing sound while driving a motorized vehicle. The earphones immediately stop localizing the voice of Bob and switch the call from providing Alice with binaural sound to providing Alice with mono sound.

Consider the example above in which Alice wears earphones and localizes a voice of Bob in front of her during a phone call. The car has a sensor that determines Alice is on a binaural call and instructs an HPED of Alice to switch the call to mono. As another example, when Alice enters the car, a system in the car pairs with the HPED and automatically switches the call from binaural to mono. As another example, a GPS device or object recognition device (such as a camera with object recognition software) determine that Alice is entering or in the car and provides a signal to the HPED or other source of the call to switch the call from binaural to mono.

Consider an example in which Glen is on a phone call with Alice in which a voice of Alice appears to Glen as stereo sound through speakers in an HPED that he holds. Alice informs Glen that she wants to talk to him “face to face” and requests that they meet in a visually rendered chat room. Glen goes into a quiet area in his house and dons a heads-up display (HUD) that couples with his HPED and meets Alice in the chat room. This action of donning the heads-up-display automatically switches the voice of Alice from stereo to binaural.

Consider the example above in which Glen is on a phone call with Alice while he holds his HPED. Alice dons her heads-up display, and she transfers the call to her heads-up display. Her heads-up display sends a binaural codec invitation to Glen's HPED requesting the HPED to select a binaural codec or giving the HPED a choice of codecs that include a binaural codec.

Figure 7:
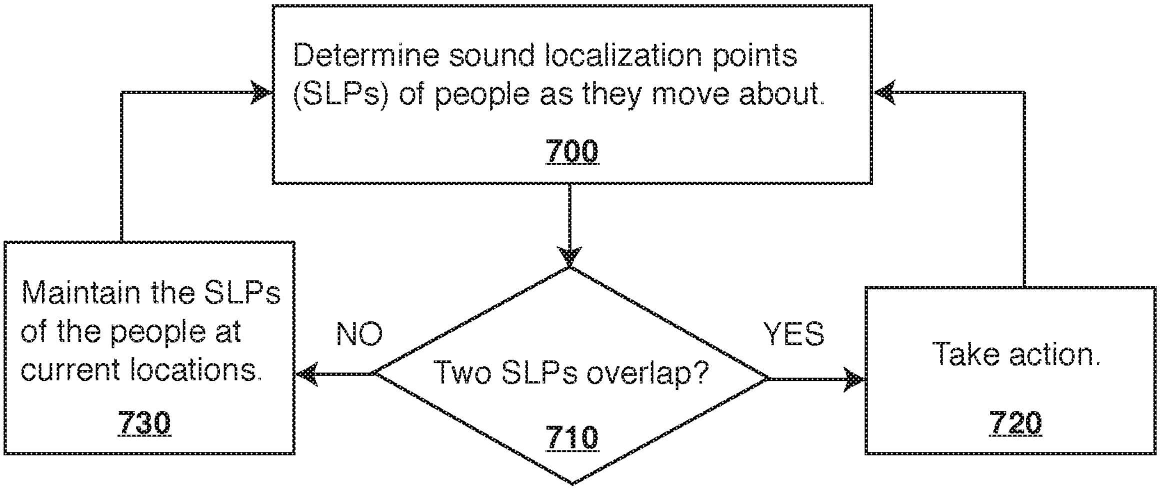
FIG. 7 is a method to determine SLPs of people as they move and to take an action when two SLPs overlap in accordance with an example embodiment.

FIG. 7 is a method to determine SLPs of people as they move and to take an action when two SLPs overlap.

Block 700 states determine sound localization points (SLPs) of people as they move about.

A SLP can be an area in space, an area on an object, or an object itself. Furthermore, more than one SLP can be associated with a single person or audio source.

In examples discussed herein, a voice SLP can occur together with its respective Virtual Microphone Point (VMP). Overlap or proximity of a SLP with a non-associated VMP can be similarly prevented. For example, Bob localizes the voice of Alice at a SLP beside his desk, localizes the same voice of Alice simultaneously at another SLP in the kitchen, and designates just her VMP at his armchair so he can dictate notes to her from the chair. Block 700 also determines if a SLP not associated with Alice overlaps this VMP and takes appropriate action, such as switching that SLP to mono.

Block 710 makes a determination as to whether two SLPs overlap.

Areas of SLPs can have different sizes and shapes. Further, two or more SLPs can actually overlap or collide, such as taking up or using or occurring in a same space at a same time. Alternatively, the SLPs can be close to each other to cause an overlap condition (such as being within a few inches of each other or within a few feet of each other). SLPs can overlap at external locations (such as two SLPs appearing to originate from a same or similar location) or overlap at internal locations (such as two SLPs appearing to originate from a same point inside a head of a listener).

If the answer to the determination is "yes" then flow proceeds to block 720 that states take action.

If the answer to the determination is "no" then flow proceeds to block 730 that states maintain the SLPs of the people at the current locations.

Consider an example in which a computer system provides through electronic earphones, a person with a binaural sound of a voice of an intelligent personal assistant during a voice exchange with the person such that the voice of the intelligent personal assistant localizes to the person at a sound localization point (SLP) in empty space that is away from but proximate to the person. During the voice exchange, the computer system senses or detects a voice of another person, such as another person proximate to the person or talking to the person. In response to this detection, the computer system changes the sound of the voice of the intelligent personal assistant from being provided in binaural sound and localized at the SLP to being provided in stereo sound or mono sound. The computer system can also remove one or more SLPs or otherwise alter or change the binaural sound so the voice of the intelligent personal assistant no longer localizes to the SLP (such as removing the SLP, moving the SLP, pausing the SLP, removing one or more audio cues in the binaural sound, turning off a speaker, mixing sound, etc.).

Consider an example in which Alice is on a phone call to Bob in which a voice of Bob localizes to a location in front of Alice. At the same time, Charlie is on a phone call to Dave in which a voice of Dave localizes to a location in front of Charlie. During the calls, Alice and Charlie step onto an escalator and stand beside each other such that a SLP of Bob overlaps with a SLP of Dave. In response to this overlap, the voice of Bob switches to stereo or mono such that there is no longer an overlap with the SLP of Dave. Alternatively, the voice of Dave switches to stereo or mono or both the voice of Dave and the voice of Bob switch to stereo or mono.

Consider the example above in which Alice and Charlie are on phone calls. When Alice and Charlie step onto the escalator, the voice of Bob localizes away from Charlie and away from the SLP of Dave. The voice of Dave, however, localizes onto or very near Alice. From Charlie's point of view, the voice of Dave appears to emanate from Alice. Dave's voice thus overlaps with the physical location of Alice. In response to this collision, the system immediately moves the SLP of Dave or switches the sound of Dave's voice to stereo or mono.

Figure 8:
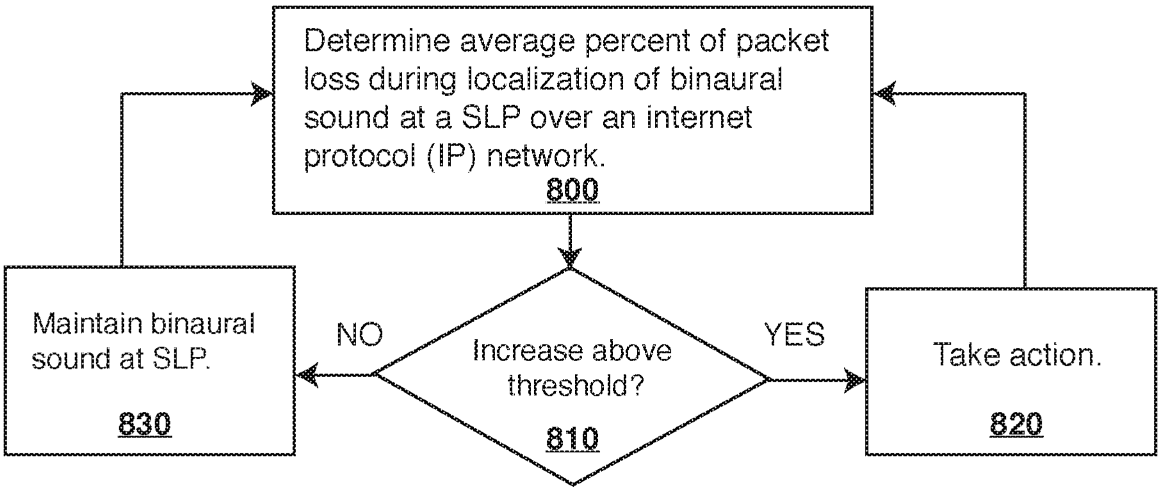
FIG. 8 is a method to determine average percent of packet loss during a transmission and to take an action when packet loss increases above a threshold in accordance with an example embodiment.

FIG. 8 is a method to determine average percent of packet loss during a transmission and to take an action when packet loss increases above a threshold.

Block 800 states determine average percent of packet loss during localization of binaural sound at a SLP over an internet protocol (IP) network.

Block 810 makes a determination as to whether the average percent packet loss increased above a threshold.

Packet loss occurs when one or more packets of data traveling across a network fail to reach their intended destination (e.g., due to network congestion). In the case of User Datagram Protocol (UDP), packet loss occurs when packets are received outside the jitter buffer. Packet loss is measured as a percentage of packets lost with respect to packets sent. By way of example, packet loss is measured as a frame loss rate (i.e., a percentage of frames that should have been forwarded by a network but were not forwarded).

If the answer to the determination is "yes" then flow proceeds to block 820 that states take action.

If the answer to the determination is "no" then flow proceeds to block 830 that states maintain binaural sound at SLP.

Consider an example in which a person initially listens to binaural sound under network conditions that provide suitable bandwidth for this sound. Network conditions deteriorate due to packet loss. The listener's system detects that the packet loss has exceeded a predetermined threshold for percent loss and initiates a request to a source of the sound for a change to a single channel codec in order to use less bandwidth. The source of the sound accepts the request and switches to providing the listener's system with the sound using a single channel codec.

Figure 9:
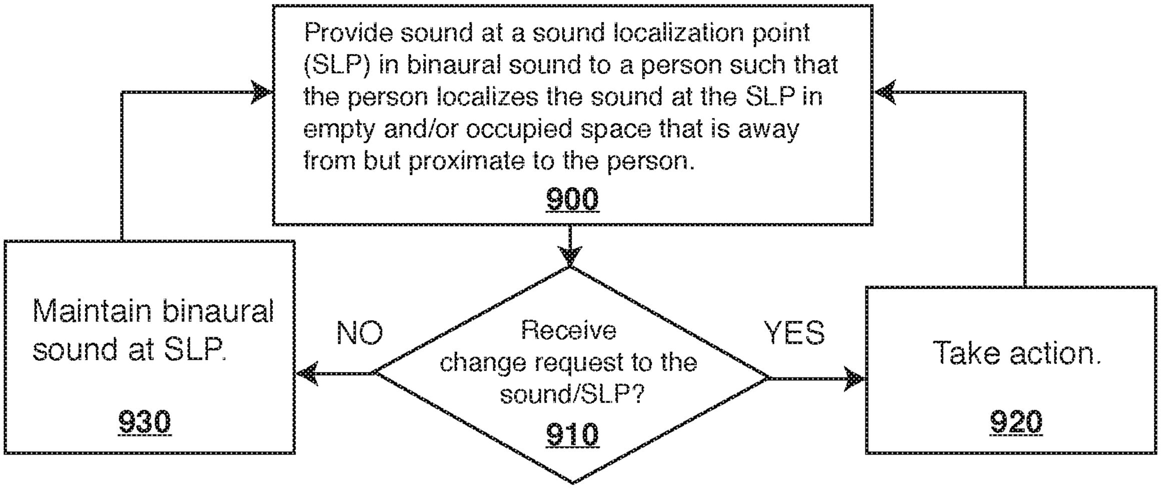
FIG. 9 is a method to provide sound at a SLP to a person and to take an action when a change request is received in accordance with an example embodiment.

FIG. 9 is a method to provide sound at a SLP to a person and to take an action when a change request is received.

Block 900 states provide sound at a sound localization point (SLP) in binaural sound to a person such that the person localizes the sound at the SLP in empty and/or occupied space that is away from but proximate to the person.

Block 910 makes a determination as to whether a change request to the sound and/or SLP is received.

If the answer to the determination is "yes" then flow proceeds to block 920 that states take action.

If the answer to the determination is "no" then flow proceeds to block 930 that states maintain binaural sound at SLP.

Consider an example in which an intelligent user agent localizes a voice of an intelligent personal assistant for Alice at a SLP in space that is five feet from Alice. While Alice and the intelligent personal assistant are talking in a voice exchange, Alice is speaking too loudly to the SLP of the intelligent personal assistant. The intelligent user agent notices this fact and generates a change request that instructs the system to move the SLP closer to Alice to a location three feet from Alice. The voice of the intelligent personal assistant now appears closer to Alice so she lowers her voice while talking to the intelligent personal assistant.

Consider an example in which Alice is talking to her intelligent personal assistant that localizes to a SLP that is three feet from her. She wants to tell her intelligent personal assistant a secret and issues a verbal instruction: "Move a little closer please." In response to this instruction, the SLP of the intelligent personal assistant moves close to Alice's face and she whispers the secret to the intelligent personal assistant.

Figure 10:
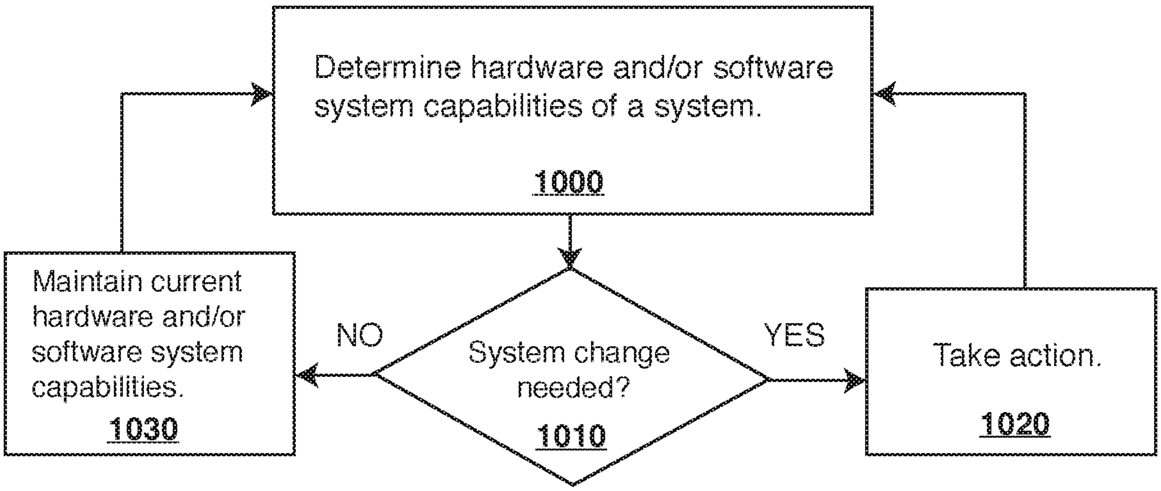
FIG. 10 is a method to determine hardware and/or software system capabilities and to take an action when a system change is needed in accordance with an example embodiment.

FIG. 10 is a method to determine hardware and/or software system capabilities and to take an action when a system change is needed.

Block 1000 states determine hardware and/or software system capabilities of a system.

Block 1010 makes a determination as to whether a system change is needed to the hardware and/or software system capabilities.

If the answer to the determination is "yes" then flow proceeds to block 1020 that states take action.

If the answer to the determination is "no" then flow proceeds to block 1030 that states maintain current hardware and/or software system capabilities.

Consider an example in which Alice is on a binaural phone call and her call is forwarded to her landline phone that provides a mono sound. The system is aware of the new routing of the call through plain old telephone system (POTS) twisted pair so the system requests a switch from binaural sound to mono sound.

Consider an example in which a voice chat application issues a request to an application of another party to switch from mono sound to binaural sound. Alice holds her binaural capable HPED to her left ear. Using a single microphone and a single speaker in the body of the HPED, she speaks monophonically to Bob with a binaural capable voice chat application. When Alice couples her electronic earphones with the HPED, the HPED operating system senses this action, and sets its ActiveBinauralHeadphones HPED system property to TRUE. The voice chat application running on the HPED polls the ActiveBinauralHeadphones property, detects a change from FALSE to TRUE, and requests from Bob's application a switch from mono sound to binaural sound. Thus, the switch occurs when a hardware change modifies a value of the system property.

Consider an example in which a switch occurs when a party with limited capability joins a call. Alice is talking to Bob in a binaural conversation when Charlie patches into the call at less than 144 kbits/second from his 2.5G (mobile generation) backup mobile phone. The system recognizes the slowest link in the multiparty call and requests Alice and Bob to switch to a mono voice-optimized codec so that all parties are mono and bandwidth is reduced. Charlie has an improved comprehension of Alice and Bob during the call. Thus, a switch occurs when a party with limited hardware, software, and/or network capabilities joins a communication.

Consider an example in which a switch is requested by an audio dependent application that requires a specific audio type of sound. Alice talks to Bob in a binaural conversation, and Bob activates his voice recognition agent to transcribe the conversation. Bob's voice recognition agent can process stereo voice with a higher accuracy than binaural voice or mono voice, so the agent requests Alice's system to transmit stereo sound instead of binaural sound. Alice's system complies with the request, and Bob's system continues to send binaural to Alice so she can continue to localize the voice of Bob during the binaural conversation.

Consider an example in which smart home appliances cause a switch between binaural and stereo sounds. Alice returns home from work and wears her electronic earphones that communicate with her home private network system and inform the system that she is home and wearing the earphones. When Alice walks into the kitchen, her refrigerator speaks to her through the earphones. A voice of the refrigerator localizes to a point in empty space in front of a door of the refrigerator.

Home appliances in her house are thus able to provide her with information and updates at various SLPs throughout the house. While Alice stands in her living room and looks over to her fan, a sound of a small fan motor localizes onto the physical, actual small fan in the corner of the living room. Although the fan is running, the noise of the motor is so soft that Alice is not able to hear it without an audio assist of binaural localization. So, a soft, but audible, sound of the fan localizes onto the fan through the earphones so Alice knows the fan is running when she looks in its direction. When Alice enters her bedroom, she removes the earphones, and they send a REMOVE signal to the home network system. In response to this signal, the system switches the home appliances from a binaural mode to a stereo mode in which they communicate with Alice in stereo sound or mono sound instead of binaural sound. Thereafter, a clock in Alice's bedroom announces the time to her in stereo sound through speakers in her stereo system.

Switching can also occur when a system determines that a richer audio experience is available to one or more users. Consider an example in which Alice and Bob talk to each other over a stereo voice exchange while reviewing school notes. After they complete this task, they agree to proceed and meet in their favorite three-dimensional (3D) visually rendered chat space. When they enter their respective virtual locations, their applications sense and recognize them both and know their relative positions in the space. In response to these determinations, an application notifies a SLS that binaural communication is available and requests to switch the audio from stereo to binaural and set their respective SLPs proximate to the visual representations of each other in the chat space.

Consider an example in which Alice and Bob are both in a 3D visually rendered space talking binaurally face-to-face in full-duplex with each person in a medial plane of the other. Because they can see each other's visual representation, they experience accurate sound localization of each other's voices. Soon Alice turns off her display and is left with only the binaural audial experience of their talk (i.e., Bob's SLP no longer has an accompanying visual image). Due to the lack of a visual cue, Alice cannot accurately locate the SLP of Bob's voice. The system detects that her screen is off, knows Bob's SLP is in her medial plane, and knows she has no head tracking hardware. The system makes a verbal announcement to Alice ("Adjusting localization") and moves Bob's SLP to a predetermined position that Alice has chosen for all communications with no visual image. Alice is familiar with where this location is and looks to Bob's SLP as she continues the conversation with Bob.

Consider an example in which motion cues during a conversation indicate that a person is not localized accurately and the system takes an action (such as switching voice from binaural to stereo or to mono). For example, Alice and Bob are enjoying a satisfying binaural voice exchange while Alice's head tracking is active. Her head is relatively steady, and the system heuristics deduce that she is seated. Suddenly, a song begins to play in Alice's space, and the system deduces that Alice may be dancing on a crowded noisy dance floor. The system also knows that such motion causes jerking and irregular motion of the audio sources coming from Alice that are not her voice when experienced in Bob's reference frame. This continuing motion can trigger nausea or discomfort for Bob. In response to this determination, the system switches to mono sound.

Figure 11:
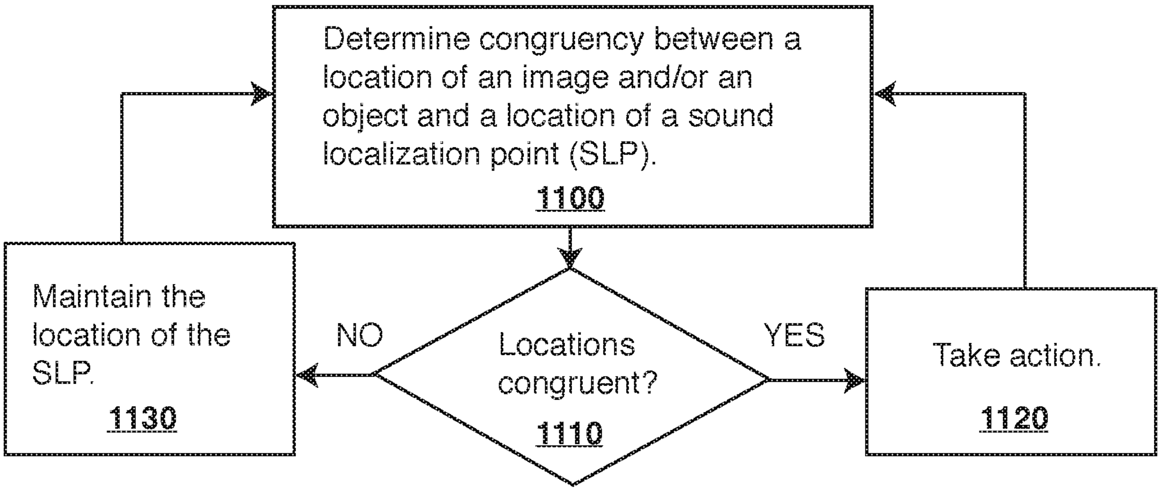
FIG. 11 is a method to determine congruency between a location of an image and a SLP and to take an action based on location congruency in accordance with an example embodiment.

FIG. 11 is a method to determine congruency between a location of an image and a SLP and to take an action based on location congruency.

Block 1100 states determine congruency between a location of an image and/or an object and a location of a sound localization point (SLP).

Block 1110 makes a determination as to whether the location of the image and/or the object and the location of the SLP are congruent.

The image can be a visual image, such as a rendered image of an object, a point, an area, or a location that appears in augmented reality or virtual reality. For example, the image appears where a person believes a SLP is located.

If the answer to the determination is "no" then flow proceeds to block 1120 that states take action.

If the answer to the determination is "yes" then flow proceeds to block 1130 that states maintain the location of the SLP.

In visual space, a location of an image and a perceived location of an image coincide since a person looks at the image and knows its location. If a computer renders or supplies an image to a person, the computer also knows or can calculate this location with precision. In an effort to localize a sound, however, a person can suffer inaccuracy since the person does not have a respective complementary visual image to fix to a SLP. Instead, in response to a sound from a SLP, the person looks to a location in empty space where he perceives the sound to localize. Alternatively, even if such a reference image or object exists, coordinates of a SLP and coordinates of a perceived SLP do not agree or match. For example, the system is not using accurate HRTFs to provide suitable audio cues for a person. As another example, two individuals alternately provided with the same conditions perceive sound at a different location even though the system renders the sound to an identical static SLP for both individuals.

Consider an example in which the system places a SLP at a location in an X-Y-Z coordinate system (or another coordinate system, such as a spherical coordinate system), at a GPS location, on or near an object, with a location of an image, or at another known location. A location of this SLP, however, does not coincide or align with a person's perceived location of the SLP. As such, the system is assigned two tasks: Determine whether a SLP is at the same coordinates where a person perceives the SLP to be located, and execute an adjustment to the SLP if the coordinates of the SLP do not agree with a person's perceived position of the SLP.

Consider an example in which Alice watches a movie at home on her smart 3D television (TV) while she sits on her couch. Sounds from the movie localize to various SLPs between her and the TV and onto the TV. A head tracking system tracks orientations of her head as she watches the movie, and she focuses on the speaking actors at various SLPs. The system determines from these head tracking measurements that Alice's gaze is ten degrees (10°) away from or off a particular SLP location. In other words, a gaze or direction in which Alice looks does not align with a direction toward a position the system holds for the SLP it has placed in empty space in front of Alice. In order to compensate for this discrepancy, the system calculates and stores an offset vector for the SLP as the delta between the system SLP position and the position where Alice is actually looking. Thereafter, the system can use the offset vector for Alice to provide her with increasingly improved SLP perception.

Consider an example in which Alice wears wearable electronic glasses or augmented reality (AR) glasses with head tracking and is in an AR environment where she talks to an image of Bob that appears on her wall. Her audio localization system localizes a sound of Bob at a SLP that appears at an X-Y-Z coordinate location that exactly coincides or overlaps with an X-Y-Z coordinate location of the image of Bob. This occurs so that the voice of Bob should appear to Alice to originate from the image of Bob. During the chat, however, Alice repeatedly moves or shifts her head slightly to one side when Bob speaks. This shifting alerts the system that the position where Alice is localizing the sound of Bob does not exactly align with her perception of the image of Bob. In response to this observation, the system slightly moves the SLP of the voice of Bob so that Alice looks directly at the image of Bob when she talks to Bob.

Consider an example in which Alice wears an AR headset or electronic glasses that track her head movement and eye gaze. The electronic glasses include speakers on the arms of the glasses near her ear. These speakers provide Alice with binaural and stereo sound. When Alice enters her house, smart appliances provide information about their state using voice messages, and they can act upon verbal instructions from Alice. Voices of these smart appliances localize to SLPs that appear on the appliance (such as a voice of an IPA, IUA, or another voice). While having a full-duplex or half-duplex voice exchange with these appliances, Alice's system notices that her initial gaze does not align with a location of her kitchen appliances when she talks to the appliances. The system tries to adjust or move the SLPs for these appliances, but the system's adjustments fail to align the gaze of Alice with the direction toward the appliance. The system switches to providing Alice with non-localized stereo sound when she speaks with these kitchen appliances. Thereafter, the system executes a passive alignment procedure that includes one or more of updating system software, checking for revised HRTFs for Alice, reporting misalignments to software developers, and recalibrating gaze angles and collected head tracking information.

Figure 12:
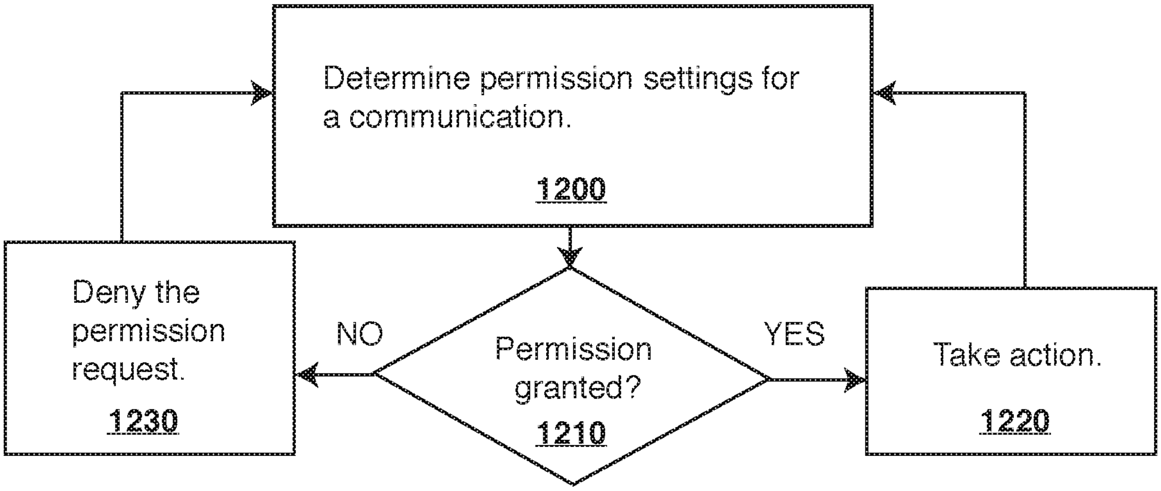
FIG. 12 is a method to determine permission settings and to take an action based on a permission granted in accordance with an example embodiment.

FIG. 12 is a method to determine permission settings for a communication and to take an action based on a permission granting.

Block 1200 states determine permission settings for a communication.

For example, the communication can be a voice exchange or a communication that involves binaural sound and one or more SLPs, stereo sound, or mono sound.

Block 1210 makes a determination as to whether a permission is granted based on the determined permission settings.

If the answer to the determination is "yes" then flow proceeds to block 1220 that states take action. For example, a remote requestor is granted permission to access certain local data.

If the answer to the determination is "no" then flow proceeds to block 1230 that states deny the permission request. For example, the requestor is denied permission to take an action. These permissions or access rights control one or more abilities of the user.

The system can assign permissions or access rights to users (including people, software applications, processes, user agents, intelligent personal assistants, etc.). The permissions or access rights control the ability of the users to read, modify, or execute contents of the system (including read, write, append, prepend, execute, delete, hide, unhide, lock, unlock, move, rename, etc.), set timestamps for create, last read, last write, encrypt, decrypt, etc. By way of example, individual file permissions can be managed as Unix file permissions or resources managed as access control lists. As another example, access rights can be managed further with file attributes.

Consider a simple example in which a system uses read permissions (that grant access to read a file), write permissions (that grant access to modify a file), and execute permissions (that grant access to execute a file). While Bob is with Alice at her house, they decide to don a pair of WEDs and play an augmented reality game. In order for Alice's home entertainment system to render the SLPs for Bob, the system needs his HRTFs or other information (such as his biometric data such as height, weight, facial data, pinnae data, etc.). Alice's system contacts Bob's system and requests the information, including HRTFs of Bob. Bob's system determines, per an access control list, that Alice has read permissions for Bob's HRTFs. Bob's system encrypts the HRTFs and sends them over the Internet to Alice's system account. Alice's system decrypts the HRTFs and renders both Alice's SLPs and Bob's SLPs while they both play the augmented reality game at Alice's house.

Consider an example in which Alice goes to a virtual reality game center to play a virtual reality game with other players. Alice pays a fee to rent the hardware and a fee for two hours of play time. The game center, however, needs Alice's HRTFs in order to accurately render an externalized audio experience for her during the game. Alice does not carry this data, but she does have this data stored on a cloud server (such as HRTFs being stored as an Audio Engineering Society AES69 file). Her HPED provides the game center with access codes that include permissions to access the cloud server and retrieve Alice's HRTFs. The game center retrieves her HRTFs and renders her SLPs while she plays the virtual reality game for two hours with the other players. Alternatively, Alice does not provide her HRTF file, but provides 120 minutes of temporary execute access to her HRTF functions, while the functions themselves (functions of her own biometric information) continue to reside on the cloud server whose access she controls. During the game, the game center renders necessary sounds for Alice's perception through the HRTF stored on Alice's cloud server, and she receives the output in her earphones or headphones. After 120 minutes elapses, her cloud server refuses further execute access by the game center to create binaural sound output specific to her HRTFs. In this way, highly accurate binaural sound cannot be created for Alice without her knowledge and approval.

Consider an example in which Alice and Bob are using electronic earphones that capture and transmit a wide-band sound-scape with multiple different SLPs around the environment of each of them. Soon they receive an alert from Charlie that he wishes to join their conversation. The system examines the permission settings of Alice and finds that Charlie is not a member of a set people who have default permission to experience or join her spatial audial environment. Before Charlie is actually admitted into the conversation, the system switches the conversation to non-localizing stereo as dictated by Alice's privacy settings.

Figure 13:
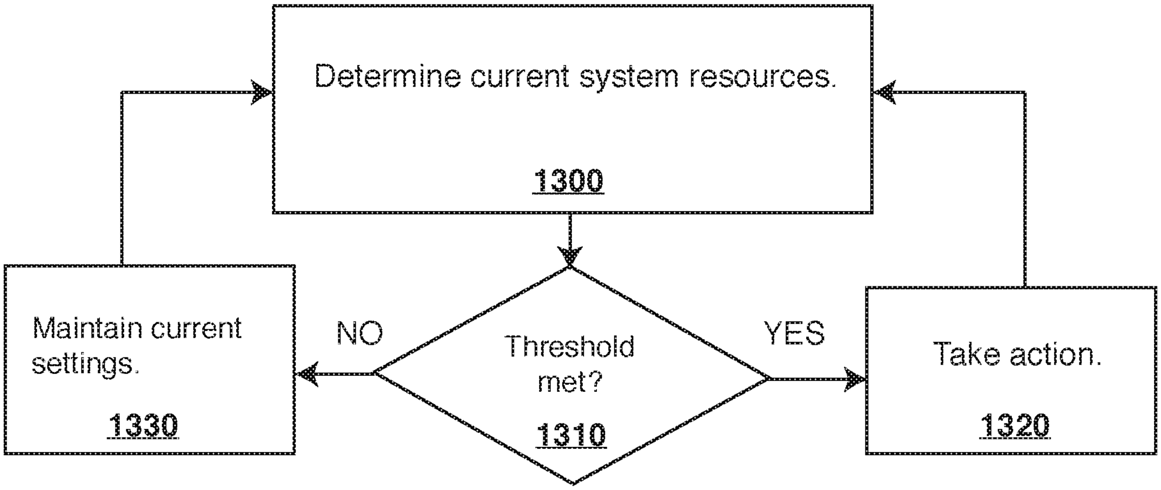
FIG. 13 is a method to determine system resources and to take an action when a threshold is met in accordance with an example embodiment.

FIG. 13 is a method to determine system resources and to take an action when a threshold is met.

Block 1300 states determine current system resources.

By way of example, system resources include, but are not limited to, computer system resources (such as components that provide capabilities and contribute to a performance of the system, like memory, cache memory, hard disk space, processing power, etc.), operating system resources (such as internal tables and pointers that track running applications, hardware, and software), network resources (such as bandwidth and including network sockets), virtual system resources, input/output (I/O) resources (such as resolution), electrical power, monetary resources, credits for online purchases, distributed ledger resources (such as cryptocurrency), distributed application and smart contract resources (such as "Ether"), and other resources related to a computer and/or computer system.

Consider an example in which the system determines one or more of an amount of battery usage or battery life, available processing power or bandwidth, available or type of memory, a number of threads being processed, network upload speed, network download speed, available or current hardware (such as what type of and/or configuration settings of wearable electronic glasses (WEG), HPED, WED, computer, system, etc. a person has or is using), available or current software (such as what software programs or operating systems are executing on WEG, HPED, WED, computer, system, etc. a person has or is using), available or current software, and predicted available system resources.

Block 1310 makes a determination as to whether a threshold is met with the system resources.

By way of example, a threshold can be based on a percent being used, a percent available, a predetermined amount, a ratio or proportion, a dynamic amount, a positive or negative integer, a difference between an amount and an amount in another system, a predicted amount, an estimate, and a value falling within or without one or more ranges.

If the answer to the determination is "yes" then flow proceeds to block 1320 and an action is taken.

If the answer to the determination is "no" then flow proceeds to block 1330 and the current settings are maintained.

Consider an example in which Alice is in a binaural conversation on a battery powered HPED with an electronic earphone. The battery on her HPED discharges below a certain threshold. In response to this discharge below the threshold, the system switches to mono and the battery life is extended at the expense of Alice's spatial experience.

Consider an example in which Alice initiates a full-duplex or half-duplex binaural telephone call over a third telephony application to Bob's HPED that is adapted to receive and play such binaural calls. Alice is unaware, however, that Bob is staying in a hotel, and all calls to his HPED are being forwarded to a land-line in his hotel room. The telephone in the hotel room is not capable of providing audio services in binaural sound. When Bob picks up the telephone, the call commences in a mono call to both Alice and Bob. As Bob picks up his telephone receiver, Alice's intelligent personal assistant states to Alice: "Call proceeding in mono." Alternatively, Alice hears a special sound such as a binaural sound at a SLP near to and apart from her that quickly de-spatializes into a SLP perceived to be located within her head (the binaural sound transforming into a monophonic sound).

Consider the example above in which Alice initiates a telephony application call to Bob who watching TV and who is located in a hotel room with a landline telephone. Alice's system preferences are set to "provide calls in binaural." Her system recognizes that Bob is responding from a plain old telephone system (POTS), and therefore Bob cannot process and provide calls in binaural sound. Alice's system switches to a codec suited to this situation. The codec receives Bob's voice and the sound on the TV from the POTS. Alice's SLS creates a SLP for his mono source voice by convolving with an input source parameter set to the sub-sound stream that matches Bob's voice. Alice now experiences binaural sound in the conversation with Bob who experiences mono sound.

Consider an example in which a smart contract (such as one executing on a distributed application network) renders incoming sound to Alice's HRTFs that are encrypted within a distributed application (DApp). The smart contract sends the output to Alice as long as a threshold of a cryptographic currency is greater than the equivalent of one hundred U.S. dollars.

Figure 14:
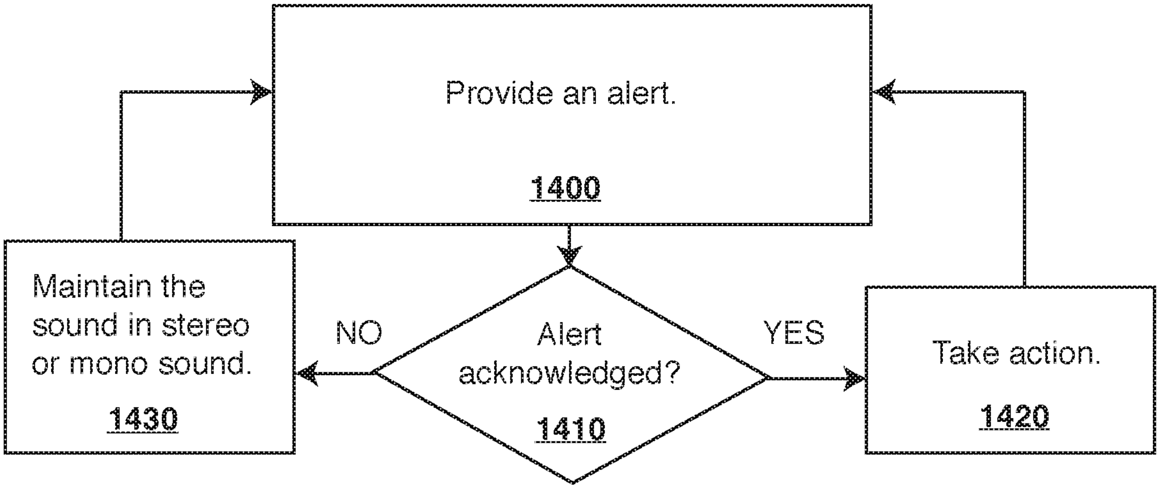
FIG. 14 is a method to provide an alert and to take an action based on whether the alert is acknowledged in accordance with an example embodiment.

FIG. 14 is a method to provide an alert and to take an action based on whether the alert is acknowledged.

Block 1400 states provide an alert.

For example, the alert is an audible alert and/or a visual alert to a person. By way of example, such alerts include, but are not limited to, one or more of a displaying a visual warning, providing an audible sound, displaying or transmitting a message, altering or adding or removing an image or indicia, providing a command or instruction or notice to a process or computer program, actuating a light (such as a light emitting diode or LED), displaying a visual or perceivable indication or warning, playing an announcement, playing a video, and providing another indication that notifies a user.

For example, the alert notifies a person, an IUA, an IPA, an electronic device, or another software program that binaural sound is being or will be provided. Furthermore, a person, an IUA, an IPA, an electronic device, or another software program can generate the alert.

Block 1410 makes a determination as to whether the alert is acknowledged.

For example, a person, an electronic device, a process, or a software program (such as an intelligent user agent) acknowledges the alert. As an example, a process or software program responds with an ACK (acknowledgement in response to receiving the alert). As another example, a person provides a gesture or verbal response to acknowledge the alert. As another example, a person interacts with a user interface (UI) to provide an acknowledgement. As another example, a person provides no overt action, and this lack of action is an acknowledgement. As another example, a user does not respond with a negative acknowledgment (NACK).

If the answer to the determination is "yes" then flow proceeds to block 1420 and the electronic device switches to binaural sound.

If the answer to the determination is "no" then flow proceeds to block 1430 and the sound is maintained in stereo sound or mono sound.

Consider an example in which Alice wears electronic earphones that are custom molded for her ears. The earphones are so comfortable that Alice often forgets that she is wearing them. Alice localizes binaural sound with such precision that she cannot distinguish between binaural sounds provided through the earphones and binaural sounds provided in her environment. Before switching from stereo sound to binaural sound, the earphones provide Alice with an audio warning of a voice speaking: "Switching to binaural." This warning alerts or reminds Alice that binaural sounds she hears occurring in her physical environment will be mixed or augmented with binaural sounds that originate from the SLS and provided through her earphones. Alternatively, the warning provides Alice with a sound that she can readily distinguish as an alert (such as a non-naturally occurring sound).

Consider an example in which a person wears WEGs and the glasses include or communicate with electronic earphones that the person wears. When the system switches to binaural sound or powers on with binaural sound set on by default, a display in the WEGs provides a green colored icon, logo, or mark that indicates to the person that binaural sound is activated. The color green symbolizes to the person an "on state" and the display changes the color to red to symbolize an "off state." The state can also be indicated by an intermittent sound.

Consider an example in which Bob's rice cooker, a smart appliance, emits an audible chime from a speaker inside the unit when the rice has finished cooking. Bob is not in the kitchen and does not hear the chime. The rice cooker also causes an indicator to appear on Bob's HPED screen and an accompanying chime to sound from the speaker of the HPED. Bob is not using his phone and does not see the message or hear the chime. The rice begins to over-steam. The rice cooker causes a short binaurally encoded chime to sound from his headphones. Before sounding, the chime is processed with a crossfeed filter to prevent Bob from perceiving audio cues necessary to cause Bob to perceive any localization from the chime. Bob is listening to music so he does not interpret the chime as separate from the music and is not alerted to the state of the rice. The rice begins to burn. The rice cooker again causes the same chime sound file to play from Bob's headphones, but this time no crossfeed is introduced so that this time Bob perceives the chime as emanating from a point away from him in empty space. Bob distinguishes this second chime from the music Bob is hearing and it causes him to take notice.

Consider an example in which Alice uses her laptop computer to command a document to be printed. The printer is out of paper so it beeps from a speaker in its base. The printer also sends a corresponding error code to Alice's operating system that visually indicates the out of paper condition by changing the color of the printer icon on the laptop screen from black to red. Alice does not notice these alerts because the printer is in another room, and an active process window is visually blocking her view of the printer icon. The printer also transmits a binaural chime that has audio cues causing the chime to be perceived at a radius of one foot from the listener. The binaural chime transmits directly to Alice's electronic headphones via radio waves with the right channel replaced by the left channel so that Alice hears the left channel in both ears. Alice does not hear the right channel, and this results in her experiencing a monophonic chime. She mistakes the chime for an incoming email alert and commands another document to print. The printer again beeps from its speaker, alerts Alice's OS, and again transmits the binaural chime. This time, however, the system does not alter the chime, and Alice hears both the left and right channels binaurally. Alice notices the chime that emanates from the SLP one foot from her head.

Consider an example in which a child runs behind a car as it is backing up. A camera at the back of the car provides a video and audio alert in stereo to the driver. The driver, however, does not see or hear the alert so the car switches the alert to a binaural sound that emanates a sound alert from a location of the child.

Figure 15:
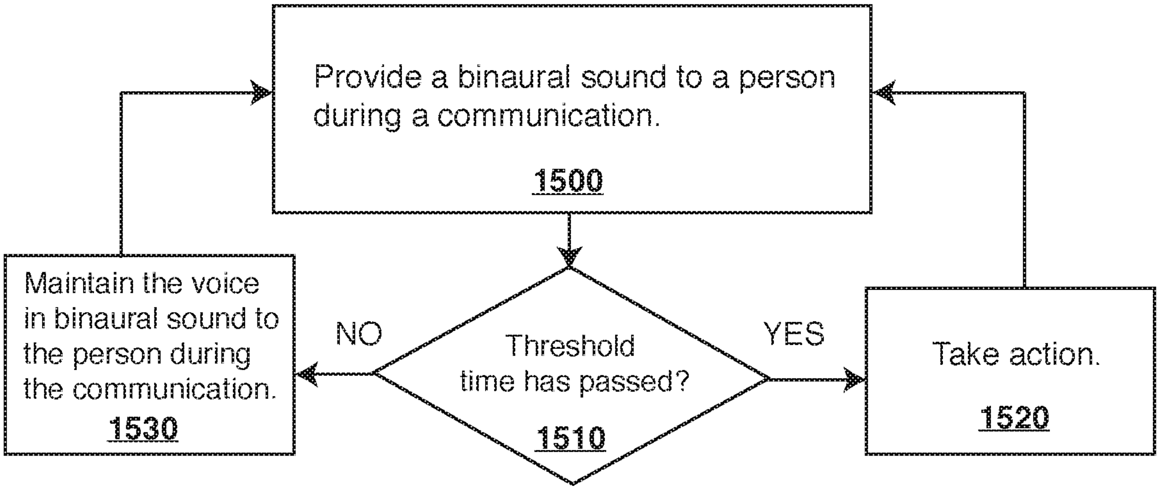
FIG. 15 is a method to provide binaural sound to a person and to take an action when a threshold time passes in accordance with an example embodiment.

FIG. 15 is a method to provide binaural sound to a person and to take an action when a threshold time passes.

Block 1500 states provide a binaural sound to a person during a communication. For example, binaural sound is provided during a voice exchange with another person or with a computer program (such as with an intelligent personal assistant, an intelligent user agent, or a software program).

Block 1510 makes a determination as to whether a threshold time has passed. For example, a predetermined time passes after a voice signal is generated, heard, sensed, transmitted, perceived, or provided, but before any subsequent voice signal is generated, heard, sensed, transmitted, perceived, or provided (or a predetermined period of voice-silence passes).

If the answer to the determination is "yes" then flow proceeds to block 1520 and an action is taken. For example, sound is switched to stereo or mono sound, a person or electronic device or a computer program is provided with an alert, or another action as discussed herein is taken.

If the answer to the determination is "no" then flow proceeds to block 1530 that states maintain the voice in binaural sound to the person during the communication.

Consider an example in which Alice and Bob engage in a voice exchange in which SLPs are provided through binaural sound. Alice falls asleep for ten minutes during the exchange so Bob silently reads a magazine to himself waiting for Alice to respond. When Alice awakes, she forgot that SLPs are being provided through her earphones and, as such, is confused or unable to distinguish between sounds that originate in her physical environment and other sounds provided by her earphones. After five minutes elapse without sensing any voice, the system automatically switches her sound from being provided in binaural sound to being provided in non-localized stereo sound or mono sound. When Alice awakes, Bob jokingly says "Good morning" and the system provides this sound in mono so Alice clearly knows that the voice originates from her earphones only and not from her physical environment.

Consider an example in which a system provides a user with a specific audial context. For example, Alice is at a family cocktail party. Her sister is abroad and lonely and cannot attend. Alice calls her sister from the cocktail party using her electronic earphones. The cocktail party room contains the sounds of many people talking at once so the system selects a voice-optimized mono speech codec to highlight Alice's voice and filter the other voices as background noise. After some time Alice's sister remarks to Alice, "I wish I could be there on the green chair and just listen to everyone." Alice sits on the green chair without speaking so her sister can hear the many conversations in the room. The system senses that the voice exchange in the call has ceased, and heuristics indicate that listening is therefore likely a priority for one or both parties. In order to pass the maximum amount of information between the (likely) listening parties who are not speaking, the system switches to a wide-band binaural codec, allowing Alice's sister to hear all the sounds that Alice can hear rather than just emphasizing the speech of Alice. Alice's sister is able to employ "the cocktail party effect" and she distinguishes, in turn, the content of each of the many conversations in the room.

Figure 16:
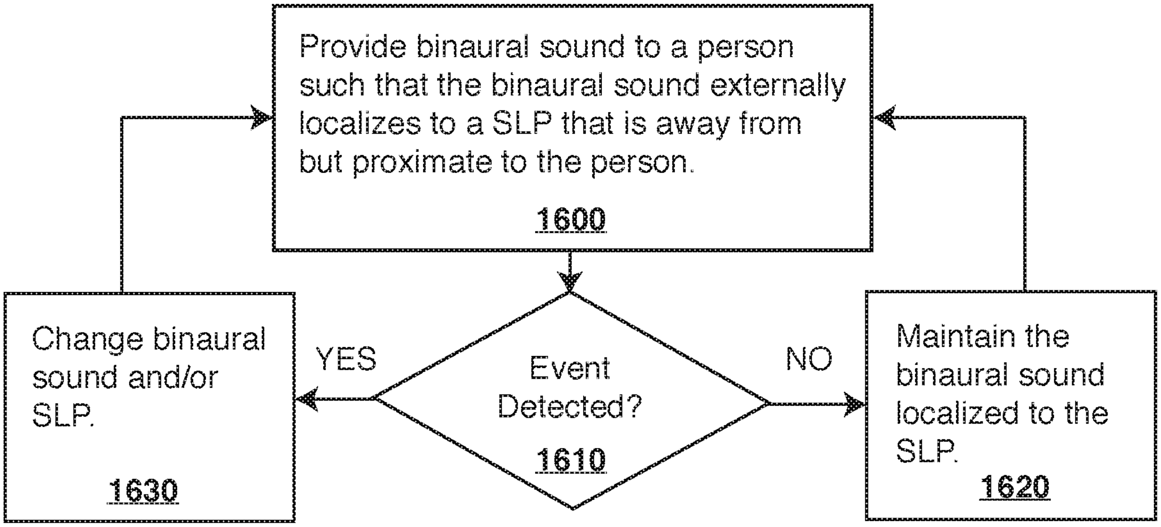
FIG. 16 is a method to provide binaural sound to a person and to take an action when an event occurs in accordance with an example embodiment.

FIG. 16 is a method to provide binaural sound to a person and to take an action when an event occurs.

Block 1600 states provide binaural sound to a person such that the person externally localizes the sound to a sound localization point (SLP) that is away from but proximate to the person.

Block 1610 makes a determination as to whether an event is detected.

If the answer to this determination is "no" then flow proceeds to block 1620 and the binaural sound is maintained at the SLP.

If the answer to this determination is "yes" then flow proceeds to block 1630 and a change is made to the binaural sound and/or the SLP.

Among other things, events can be triggered by changes in a user's or a remote user's network conditions, system resources, hardware, software, operating system notifications, the passage of time, the granting or denial of various resource and/or file permissions, a change in the ability to detect motion and/or object location and/or orientation and/or position in a physical or a virtual environment, or a change in the ability to detect an environment, its shape, acoustic properties, or noise level. Events are also triggered according to one or more audio cues detected in a user's or a remote user's physical or virtual environment such as cues indicating a location, position, or orientation, or a change in them, cues indicating a reference frame of a user or a remote user, a lateral or vertical motion, a change in distance, a change in a physical or a virtual environment such as its shape, acoustic properties, noise level, or placement of objects or structures in the environment. Events can also be triggered by a change in the spatial or positional congruency between shapes or things within multiple physical or virtual environments, or by a request from a user or a remote user or their application software, operating system, or hardware.

Events can be triggered by a change in a user's ability to associate visual cues or images with the associated audio cues, such as a visually rendered character vanishing from an augmented or virtual environment, the presence or absence of a physical object, a failure of a visual display system, a degradation in the visibility of a user's physical or virtual environment, or the impairment or failure of a user's physical eyesight. For example, when a listener externalizes a SLP in his cone of confusion, a system switches the SLP to stereo or mono to prevent irritation of the user, or when judged appropriate can move that SLP out of the cone of confusion instead. A user is irritated by the positional blurring he perceives to SLPs that do not have a corresponding visual anchor, and the system switches accordingly. As another example, a user who has lost visual display of an environment being presented in stereo or mono can benefit by having the system switch the presentation of the audio to binaural. Such a switch occurs if a determination is made that an environment can be spatially perceived through audio only.

Further yet, a switch or a change can be triggered by an event due to resource limitations or in the interest of conserving resources. For example, a change occurs in an instance when a binaural sound is judged too complex to render "just in time" for conversational pacing. This situation can occur when a set of SLPs move (or a user or remote user moves) quickly, the SLS can switch to render the sounds in stereo or mono during the movement. Sources judged too difficult to convolve can be switched to stereo or mono sound such as twenty ping-pong balls bouncing in a virtual room, or such as if a SLP has a rolling average velocity above a certain threshold. When a final output stream is judged too complex or impossible for the user to achieve externalization, the output stream can be switched to stereo or mono. For instance, this situation might occur when five binaural streams are layered from five binaural calls, or binaural streams are layered from callers in environments that are too dissimilar such as a three-way call between persons in an open office, a cathedral, and a narrow hallway.

The rendering of a SLP can be switched to mono if it has been muted or if it will not make sound for a period of time as judged by a prediction. As another example, if most or all of the SLPs in a space are in or very near the medial plane or directly over the head of a listener they can be switched to mono. As another example, if all SLPs are known to be located on or very near the same lateral plane they can be switched and presented to the listener in stereo. If, based on the known topology and/or SLP locations, a determination is made that a binaural representation will not add substantively to a listener's experience, the source can be changed from binaural to stereo or mono, for example, if all or most of the SLPs are far away or overhead.

It may be in the interest of both system resources and user experience to prevent switching the spatialization of a source. For example, prevention of switching can occur if a source format is judged optimal without changing its spatialization. As another example, prevention of switching can occur if the spatialization of the source matches or is compatible with a weakest link limitation between a sender and a listener. This situation can occur when a sender delivers stereo music to a binaural listener, or a sender delivers a binaural source captured at his head to a listener without headphones.

A switch or change can be triggered by an event for miscellaneous reasons. For example, if HRTF tuning is in progress, switching can be employed in the interest of preserving an acceptable listener experience rather than an optimal one. A switch can happen in order to judge a listener's response or to prevent rendering to an incompletely formed HRTF set in progress. As another example, if a noise cancellation circuit is turned on, it destroys in some instances audio cues necessary for spatialization of a binaural sound, so a switch to stereo is appropriate. As another example if a user designates one or more (particularly the sole) SLP to be output to a speaker instead of to the headphones, a switch to mono might be appropriate. Furthermore, a switch from mono or stereo to binaural might be appropriate if a listener is hearing, for example, three mono sources from three different loudspeakers in a room. In order to make the physical room quiet, the listener designates the sound to come from his headphones instead. This switch changes his percept to three loudspeakers at three SLPs at the locations of the three speakers corresponding to the sources the speakers were playing. As another example, if a listener indicates that he wants to enforce a certain spatiality at all times regardless of other factors, then an incoming source that does not match his chosen spatiality is switched.

Some spatiality can be discerned or known by a non-human (such as an intelligent personal assistant, IPA). For example, discernment of relative lateral position or panning can be achieved by computational analysis of ITD and/or ILD between channels. If an IPA can benefit from the spatial information, for example by being able to comply with the command, "Come over here on the other side of me," then a switch from mono to stereo delivery to an IPA is appropriate.

As yet another example, a switch can be triggered when the type of sound being delivered is changed (e.g., when, during a mono voice call, the voices cease and the type of sound being delivered changes to stereo music, obviating a reason to switch to stereo). As another example, a switch occurs during a voice conversation when the type of sound being delivered changes from live conversational voice (which needs to be rendered and delivered at a conversational pace) to a pre-recorded voice (which can be cached in order to be delivered at its highest quality even on a network with low bandwidth or high jitter). As yet another example, a higher spatiality sound can be used to indicate a user's or a remote user's or a SLP's status or current priority; and the sound can be switched upon the event of that status or priority changing.

Switches in SLP spatiality can be triggered not just by distance from the listener but also by a physical or virtual room geometry or object placement. For example, because accurate localization is more difficult for a listener to experience without visual cues, a convention can be set that a certain source is always delivered as mono, and not resolved into a SLP to a binaural listener in empty space unless a convenient or certain physical object is nearby in which case its SLP is set at that object's position. As another example, if there are several people/SLPs in a physical or virtual space, any SLP that travels "off stage" by leaving the room can still be included in the conversation, but the sound can switch to mono or stereo. As another example, consider a conference call in which a listener hears several other participants in mono. When a new participant joins the call, his voice is externalized outside the head of the listener at a SLP.

Additionally, spatiality of a source or a SLP can be changed according to the attention it receives from a listener. For example, "the cocktail party effect" can be simulated by increasing the spatiality or resolution or detail or loudness of a SLP detected by the system to be in the focus of the listener. Focus of the listener, for example, can be judged by a gaze, head tracking, a gesture, an indication from a pointing device, or other indication. Similarly, if the SLPs represent process "windows" in an audio augmented workspace or a Virtual Audial Display, the audial properties of the SLP representing the computer process in focus can be enhanced to improve its perception while the audial properties of the other objects are altered to reduce their perception. Additionally, in an environment with multiple SLPs, one SLP can be switched from binaural to mono or to stereo in order to internalize the sound of this SLP and make it easier to discern amongst the other SLPs remaining "out there."

A switch from binaural to stereo or mono can be used to provide spatial ambiguity. For example, a user does not want his spatial position to be known to another listener. A switch can also occur due to irreconcilable incongruity. For example, Alice is in a position that maps to Charlie's space at spatial coordinates (1, 3, 2). Bob calls into Charlie's space and happens to map to the same spatial coordinates (1, 3, 2). Charlie's system switches Alice's SLP and/or Bob's SLP to stereo.

A switch can be triggered by an event that indicates a listener is not interested in the spatial context of the audio or when it is determined irrelevant or unimportant to the listener. For example when, in a binaural call, the remote user enters a game or leaves his house to a busy street or other physical space that bears no relevance to a conversation. In this instance, a switch is initiated so the local listener is unburdened by the remote user's new environment. In another example, a user playing a game or enjoying a conversation with a remote user in a virtual space can find that sound sources in his own physical environment are distracting and irrelevant to him. In this instance, he may prefer to switch the audio of his physical environment that is being supplied to him via mic-through or pass-through headphones to be spatially reduced to stereo and internalized. Here, all externalized sounds that he perceives apart and away from him will be known as originating from remote sources or other sources not in his physical environment.

Consider an example in which a change of binaural sound and/or a SLP occurs when a hardware switch is activated. Electronic earphones or electronic headphones include a switch or button that when activated causes binaural sound to discontinue or continue (such as providing an on/off switch on the earphones or headphones).

As another example, a switch can be triggered when a user activates an Active Noise Control (ANC) function. This activation might indicate that the user is not interested in the sound of his environment and therefore not interested in a binaural experience of the space, and a switch to stereo or mono sound is appropriate in this instance. ANC does not necessarily disturb binaural audio cues, but in some instances it can, and this represents another reason to switch to stereo or mono sound. If a person in a binaural voice call is sending binaural sound, he or she can send the sound as modified by ANC for the benefit of the listener. Alternatively, a codec can perform the ANC. The system can automatically determine when to activate and deactivate ANC for a local or remote listener based on analysis of the sound or noise that the system determines can be canceled.

Consider an example in which electronic earphones include a switch that turns on and off binaural sound (such as an infrared sensor, push button switch, slide switch, or other physical or electrical switch). A user activates the switch with a single hand (such as placing a hand to one of the earphones or a housing or display of an HPED while the earphones are "on" and providing binaural sound to the listener). Movement of a hand to the switch or activation of the switch can switch between binaural and stereo, switch off binaural, switch on binaural, etc. Alternatively, such a switch activation can mute mic-thru sound only, mute non-mic-thru sound only, switch mic-thru sound only to stereo or mono, or switch non-mic-thru sound only to stereo or mono.

A change to binaural sound and/or one or more SLPs can occur based on a detection of other events as well. For example, a voice of Alice's intelligent person assistant (named Max) externally localizes near Alice's face. While Alice and Max are having a full-duplex or half-duplex conversation, Alice gets into a taxi. Max's voice ceases to externally localize and switches to internally localize to Alice. If this switch did not occur, Max's voice might originate from the taxi door or other part of the taxi. Alice also prefers not to have voices externally localize when she talks to another person (in this instance, the taxi driver).

Consider an example in which Bob is trekking up a steep path that leads to a mountain ridge. Bob wears customized earphones with a pass-thru microphone, and the earphones are so comfortable that Bob has forgotten that he is wearing them. During the ascent, Bob receives a phone call from Alice. Typically, Bob's HPED answers the call and externally localize Alice's voice three feet in front of Bob's face per settings stored in Bob's HPED. An intelligent user agent for Bob executes on the HPED and uses a GPS tracking device to determine that Bob is located mid-way up the mountain on a relatively steep incline. The intelligent user agent also consults an exercise application executing on Bob's HPED and determines that Bob is currently moving (i.e., walking up to the mountain ridge). The intelligent user agent surmises that externally localizing Alice's voice to Bob now might be dangerous for Bob since he is on a steep incline. The HPED receives the call, and the intelligent user agent adjusts the call so Alice's voice internally localizes to Bob through his earphones. In spite of the settings to externally localize Alice's voice, the intelligent user agent made a determination to trump or override the settings and have her voice internally localize to Bob. This decision was made as being in the best interest of Bob's safety.

Consider an example that switches or changes binaural sound based on verbal clues extracted during a conversation or voice exchange. For example, a voice of Bob externally localizes to an area next to Alice in her cone of confusion during a telephone call with Bob. When Alice first hears Bob's voice, she thinks the voice is behind her and states "Wait, huh, your voice, it's behind me." The system performs a keyword extraction and analysis. Based on the words in this sentence, the system determines that Bob's voice is being improperly localized to an area behind Alice. In response to this determination, the system changes or modifies the ITDs for Alice and moves the SLP of Bob's voice so it externally localizes in front of Alice.

Consider an example in which Alice wears an electronic device that performs head tracking or is in the presence of a device that performs head tracking (such as a head tracking system included in her notebook, in her desktop computer, or in her HPED). Multiple SLPs externally localize around her such that each SLP includes a corresponding image that Alice can see. When she looks at, gazes at, or focuses on a particular SLP and image, then the voice or sound from the other SLPs localizes internally, while the SLP in her focus is perceived at the location of its corresponding image. The system thus switches or changes between internally and externally localizing SLPs based on sensing a gaze of Alice and/or a position of her head with regard to the SLP. Alternatively, a situation exists for her to perceive each SLP around her, except for the SLP that she is looking at, which switches to stereo or mono sound during the time her focus is in its direction.

Consider an example in which Bob walks and wears headphones during a binaural video call with Alice through his HPED. The HPED shows a streaming video of Alice while her voice localizes to the display since Bob designated her voice at the HPED (i.e., Bob perceives her voice as a SLP that emanates from the video presented on the display). Bob enters the back of an auditorium where a speech is being given. He continues the binaural video call in the present manner without disturbing anyone because he is standing at the back and speaking softly. He instinctively raises the HPED to his ear and speaks more quietly. This action of raising the HPED causes a proximity sensor on the HPED to switch the binaural video call to mono and, in turn, de-spatializes the SLP of Alice. The SLP of Alice moves from being externally perceived from the video of the HPED to being internally perceived in Bob's head. Bob may have unconsciously continued to talk louder than necessary in order to be heard at the distance of the HPED in his hand when in fact his microphones are located at his ears. When the audio switches to mono and causes Bob to internalize the voice of Alice, he naturally switches to speaking more softly with the HPED at his ear, even though he is not using the speaker of the HPED or the internal microphones of the HPED.

A switch can also occur from one source of binaural sound to another source of binaural sound. This switch occurs, for example, when the system detects an event that initiates the switch.

Consider an example in which Alice wears mic-thru or mic-through earphones that have four modes of operation: pass-thru mode that allows sound from her environment to pass through the earphones and into her ears, silent mode that blocks sound from her environment from passing through the earphones and into her ears, music-mode or talk-mode that blocks sound from her environment from passing through the earphones but allows music or voice to play into her ears, and mix-mode that allows both mic-thru sound from her environment captured by the microphones (mics) on her earphones, and other sounds delivered to her earphones. In mix-mode, she can adjust the volume of the mic-thru sound relative to the non-mic-thru sound (e.g., music played from a recording or over the Internet, voice during a VoIP call, voice during a conversation with an IPA, manufactured binaural sound, etc.).

While standing in a café to buy coffee, Alice listens to recorded binaural music with her earphones in music-mode. She cannot hear binaural sound coming from the environment in the café since her earphones block such sound. When Alice gets to the counter and speaks her order, voice recognition software detects her voice, and this detection causes her earphones to switch from music-mode to pass-thru mode. The binaural music stops playing, and the earphones allow binaural sound in the café to pass into Alice's ears. Alice can hear sounds in the café and readily talk to the cashier and place her order for coffee. In response to detecting an event (here, Alice's voice), the system switched from recorded binaural music to environmental binaural sound.

Consider the example above in which Alice wears the mic-thru earphones that have four modes of operation. Alice sits at a table in the café and sets her earphones to mix-mode. In this mode, she listens to recorded binaural music while also allowing environmental sound captured by the pass-thru mics to pass through into her ears. She adjusts the amplitude of the environmental sound so that it is audible yet faint compared to the volume of the music. A stranger sitting next to Alice asks to borrow a pencil. Alice can hear the request since the earphones are in mix-mode. When she responds to the request, the earphones automatically pause the binaural recording and switch the earphones to pass-thru mode. After Alice speaks to the stranger, she resumes her studies at the table. The system includes a timer that resets each time it hears Alice's voice. After sixty seconds of not hearing Alice's voice, the timer sends a signal to the system, and the system switches back from pass-thru mode to mix-mode.

Consider the example above in which Alice wears the mic-thru earphones that have four modes of operation. While sitting at the table, Alice listens to recorded stereo music in mix-mode. Her HPED, which communicates with her earphones, receives a VoIP call from Bob. In response to receiving this call, the system automatically switches from mix-mode to talk-mode, silencing the mic-thru sounds. This switch in effect switches Alice from hearing stereo music and binaural environment sound to just hearing binaural voice from Bob. Bob's voice localizes to Alice two feet in front of Alice as if Bob were sitting at the table across from her. When the call terminates, the earphones switch back to mix-mode.

Consider the example above in which Alice wears the mic-thru earphones that have four modes of operation. The earphones include a switch that allows Alice to toggle between the four modes of operation. Her HPED also provides a graphical user interface (GUI) that allows her to switch between modes, select a mode, set preferences for modes, etc.

Alice can adjust parameters of the mic-thru earphone. For example, Alice can adjust a relative volume or amplitude of mic-thru or environmental sounds and non-mic-thru sounds. For instance, she can adjust a relative volume of environmental sounds that she hears versus a volume of other sounds that she hears (such as manufactured binaural sounds that are overlaid or superimposed onto the environmental sounds, voices during a communication with another person, a voice exchange with an IPA, music, etc.). These adjustments can occur in response to a switch or a dial on the electronic earphones (including a cord, if the earphones have one) and/or through the user interface on an electronic device that is in communication with the electronic earphones (such as her HPED).

Figure 17:
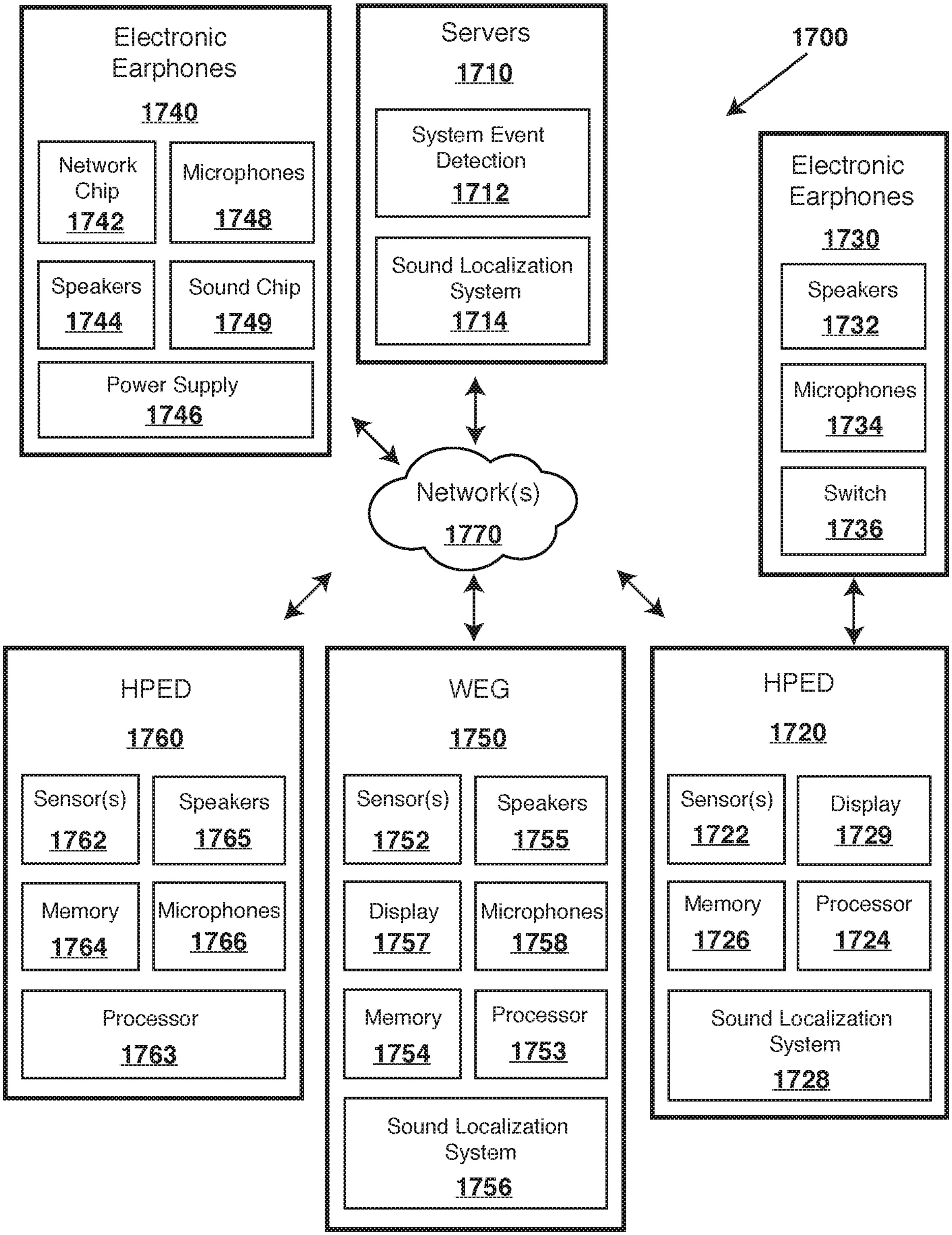
FIG. 17 is a computer system in accordance with an example embodiment.

FIG. 17 is a computer system 1700 in accordance with an example embodiment. The computer system 1700 includes one or more servers 1710 (including system event detection 1712 and sound localization system 1714), an handheld portable electronic device or a HPED 1720 (including one or more sensors 1722, a processor 1724, a memory 1726, sound localization system 1728, and a display 1729), electronic earphones 1730 (including speakers 1732, microphones 1734, and a user-activated switch 1736) coupled to or in communication with the HPED 1720, electronic earphones 1740 (including a network module or network chip 1742, speakers 1744, a battery or power supply 1746, microphones 1748, and sound module or sound chip 1749), optical head mounted display (OHMD) or smart glasses or wearable electronic glasses 1750 (including one or more sensors 1752, a processor 1753, a memory 1754, speakers 1755, sound localization system 1756, a display 1757, and microphones 1758), and an HPED 1760 (including one or more sensors 1762, a processor 1763, a memory 1764, speakers 1765, and microphones 1766) that communicate through one or more networks 1770.

The sound localization system performs or executes one or more functions or methods discussed herein (such as one or more blocks discussed in FIG. 2-16). By way of example, the sound localization system executes or assists in executing one or more of optimizing sound (including binaural sound), switching among binaural and stereo and mono sounds, localizing sound (such as localizing sound to a SLP that is away from but proximate to a user), managing SLPs, generating SLPs, moving SLPs, changing SLPs, coordinating SLPs, turning on and turning off SLPs, obtaining and transmitting and processing sensor data, managing binaural sound and binaural sound localization, rendering and altering binaural sound, its environmental and meteorological aspects, shape, geometry, objects and their placement therein, textures, and materials in the space, management of spatial and topological congruency between multi-party calls, balancing optimization of users' spatial experiences, bandwidth, and sound quality, and other functions relating to binaural sound.

Functions of the sound localization system can be executed at individual electronic devices, communicated or transmitted between electronic devices, and/or shared among electronic devices. By way of example, one or more servers 1710 include sound localization system 1714 that executes for or on behalf of electronic earphones 1740 and HPED 1760. For instance, sound localization system 1714 performs one or more functions noted herein and provides binaural sound localization information to HPED 1760, electronic earphones 1740, and other electronic devices. The electronic devices themselves can also execute one or more of such functions. For example, HPED 1720 includes sound localization system 1728 and WEG 1750 includes sound localization system 1756.

System event detection 1712 determines one or more system events or system data, such as system events or system data that affect binaural sound or sound localization. By way of example, system event detection 1712 includes sensors, processes, or computer programs that determine an average percent of packet loss during localization of binaural sound at a SLP over an IP network, determine hardware and/or software system capabilities of a system, determine permission settings for a communication, determine current system resources, and determine other data and events that involve a sensor (such as sensed events from a motion detector, a head tracker or head tracking system, a gyroscope, an accelerometer, a camera, a microphone, a magnetometer, a compass, and other sensors).

Consider an example in which Alice wears electronic earphones 1730 that wired or wirelessly couple to HPED 1720 while she communicates via a VoIP call with Bob who wears electronic earphones 1740. Earphones 1730 capture Alice's voice as binaural sound, and earphones 1740 captures Bob's voice as binaural sound. HPED 1720 converts Alice's voice from analog to digital (with an analog-to-digital converter or ADC), codes and compresses the digital stream of data per an agreed codec, and transmits this digital stream to the electronic earphones 1740 via network 1770 and servers 1710. Bob's electronic earphones 1740 are not equipped to process and localize sound to a SLP. So, sound localization system 1714 executes these functions for Bob. The servers 1710 store constants and other biometric data compatible or specific to Bob such as HRTFs used in converting Alice's digital stream into localized sound that Bob hears at a SLP that is away from but proximate to Bob. Speakers 1744 (located in Bob's ear) produce Alice's voice that localizes at the SLP. The network chip 1742 enables Bob's electronic earphones 1740 to communicate wirelessly with servers 1710 via network 1770, and the sound chip 1749 converts the digital stream into analog for playback through speakers 1744.

Consider the example above in which Alice wears electronic earphones 1730 that wired or wirelessly couple to HPED 1720 while she communicates via a VoIP call with Bob who wears electronic earphones 1740. Bob's earphones 1740 capture Bob's voices as binaural sound, and the sound chip 1749 converts this sound from analog to digital. The network chip 1742 wirelessly transmits his binaural audio stream to Alice's HPED 1720 via network 1770. Sound localization system 1728 includes or is in communication with a digital-to-audio converter (DAC), decompressor/decoder, digital signal processor (DSP), and includes hardware and/or software to process and localize sound to a SLP. Memory 1726 and/or dedicated memory in the SLS 1728 stores one or more of Alice's and/or Bob's location, position, head orientation, background noise, environmental conditions, HRTFs, gaze or head tracking offset vectors, access control lists, default listening modes, preferred listening modes, current physical activity, current network state, device hardware and software capabilities, current running processes, availability of resources, and other data. This data can convert Bob's digital stream into localized sound and/or play direct sound that the system has prepared on his behalf that Alice hears at the SLP that is away from but proximate to Alice. Speakers 1732 (located in or near Alice's ear) produce Bob's voice that localizes at the SLP.

Consider an example in which WEG 1750 localizes binaural sound to a location that is proximate to but away from a wearer of the WEG. Sensors 1752 include a specific or customized sensor with a MEMS-based inertial measurement unit (IMU). This IMU includes a microcontroller, one or more accelerometers and gyroscopes that detect changes in various attributes (like pitch, roll, and yaw) and a magnetometer that assists in calibration against orientation drift. Each of the accelerometer, gyroscope, and magnetometer provides three-axis measurements that together provide head-tracking for the WEG 1750. The IMU communicates head-tracking data to the sound localization system 1756 to provide a static SLP that localizes near the wearer of the WEG. The display 1757 displays an image on or over the SLP so the wearer sees the position of this SLP.

Figure 18:
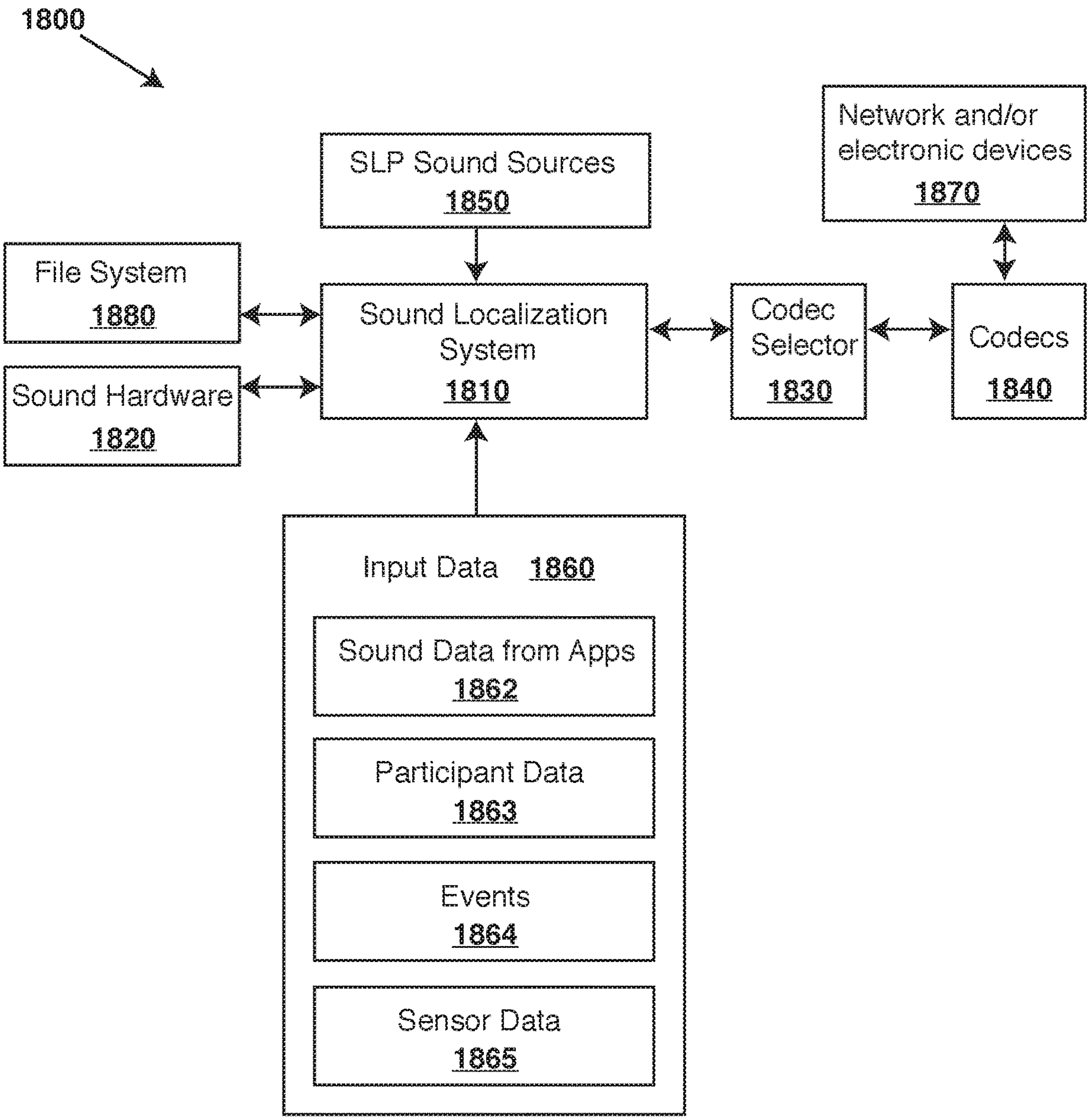
FIG. 18 is a portion of a computer system that includes a sound localization system (SLS) in accordance with an example embodiment.

FIG. 18 is a portion of a computer system 1800 that includes a sound localization system 1810, sound hardware 1820, a codec selector 1830, codecs 1840, SLP sound sources 1850, input data 1860, a network and/or other electronic devices 1870, and a file system 1880.

By way of example, the sound hardware 1820 includes a sound card and/or a sound chip. A sound card 1820 includes one or more of a digital-to-analog (DAC) converter, an analog-to-digital (ATD) converter, a line-in connector for an input signal from a sound source, a line-out connector, a hardware audio accelerator providing hardware polyphony, and a digital-signal-processor (DSP). A sound chip is an integrated circuit (also known as a "chip") that produces sound through digital, analog, or mixed-mode electronics and include electronic devices such one or more of an oscillator, envelope controller, sampler, filter, and amplifier.

SLP sound sources 1850 include sound data streams, such as raw captured real-time and prerecorded sound data, ANC output, local system sounds, computer generated sounds, prerecorded or manufactured background sounds (example, manufactured sounds not generated from callers), external sounds, manufactured sounds as SLPs, voices, remote sound sources, and sounds generated by a program or an operating system.

The codecs 1840 include one or more codecs. A codec is an electronic device and/or computer program that performs one or more of encoding a signal or digital data stream, decoding a signal or digital data stream, compressing data, and decompressing data. For example, a codec encodes and compresses a data stream before it is transmitted to storage or the network and/or electronic devices 1870.

The codec selector 1830 is an electronic device and/or computer program that selects a codec from the codecs 1840. Selection of a codec can be based on one or more events described herein, such as an event or event data received from the sound localization system 1810. For example, the sound localization system 1810 instructs the codec selector 1830 to make a particular selection of a codec, switch or change codecs, offer another party a specific selection of one or more codes, execute a codec, discontinue a codec, etc. The codec selector 1830 can also report its selection or its execution to the sound localization system 1810.

By way of example, the input data 1860 includes non-audio data such as sound meta-data, sound source properties, and other data regarding sound resource or delivery from software applications 1862 (such as properties of SLPs, positions of SLPs, properties of an environment, sound effects, vector sound objects, etc.), participant data 1863 (such as head geometry, torso geometry, HRTFs, physical space geometry, virtual space geometry, etc.), events or event data 1864 (such as a change to bandwidth, a request or command from a person or a process or an electronic device, a permission, or an event discussed in connection with FIGS. 4-16), and sensor data 1865 (such as head movement or head tracking information, position of a person, movement of a person, location of a person or an object, and input from a sensor discussed herein).

The file system 1880 can provide input sources to the SLS 1810 instead of or along with the sound hardware 1820. Source output from the SLS 1810 can be routed to the file system 1880 for recording or as a file path to a hardware device instead of or in parallel to sending it to the user's ear by way of the sound card 1820. By way of example, a Linux user can pipe or redirect the output of another audio process to the input of the SLS as a proxy for capturing the sound at his mic(s). As another example, an automated process might capture and dump to files predetermined portions of the SLS output for some later use, such as testing, quality control, security, record keeping, trusted time-stamping of events such as with a distributed public ledger, or uses not related to human audio such as ultrasound or infrasound.

The sound localization system 1810 can perform various functions and/or include various components, such as event evaluation, spatialization management, and audio rendering.

For event evaluation, the sound localization system 1810 receives local and remote events and decides if and how they should affect the data that is output by the sound localization system.

For spatialization management, the sound localization system 1810 manages geometric and acoustic properties of the local and/or remote environments (physical and/or virtual) and sound fields, and decides if and how output is affected. By way of example, SLPs can be treated as data objects and their properties (such as those that affect their perception by participants) can be set with a granularity per SLP and per listener. The sound localization system can change SLP properties (such as position) as required and permitted to optimize the communication experience. Such changes can be in response to a request or determination to maintain spatial congruency between participants (such as person in a communication).

The sound localization system 1810 can also change one or more of dimensionality, resolution, sound quality, compression, or level of voice optimization of a managed space and can communicate with the codec selector 1830. Additionally, the sound localization system can monitor sensors and receive events and determine to change its output in order to increase, decrease, or alter spatiality of one or more SLPs (including changing an ability of, allowing, or preventing a user to localize sound when listening to binaural sound).

Consider an example in which the sound localization system manages multiple SLPs and sound-fields per user during a VoIP call between multiple people. Management of these SLPs and backgrounds includes, but is not limited to, one or more of managing the call handshake, fallback selection of ring-space per user, fallback selection of answer-space per user, managing a position in 3D space of the SLPs, an orientation of the SLPs, a size of the SLPs, a sound source for the SLPs, a sound type for the SLPs, permissions for the SLPs, loudness of localized sound perceived from the SLPs, codecs for the call, rendering priority for the SLPs, elimination of rendering or overlay jobs due to SLP obstructions, movement of the SLPs, coordination or conflicts with regard to the SLPs, activation and de-activation of the SLPs, and other tasks.

For audio rendering, the sound localization system 1810 uses input parameters (e.g., from spatialization management and/or event evaluation) to integrate and/or modify audio inputs and sound data inputs before passing the modified sound to the listener and/or to other participants. By way of example, the sound localization system executes sound rendering by one or more of ray tracing/phonon tracing, recursive ray tracing, ray caching, backward ray tracing, guided multi-view ray tracing, ray sorting, corner base reinforcement, beam tracing, frustum tracing, surface simplification, account for obstructions, occlusions, exclusions, specular reflection, scattering, diffraction, refraction, Doppler effect, attenuation, absorption, late reverberation, artificial reverberation, interpolation for moving listeners, moving environments, and other dynamic sources and SLPs, emitting characteristics, psycho-acoustical rendering, Graphics Processing Unit (GPU) audio processing, filtering, layering, convolving, amplification, panning, widening, noise canceling, voice optimization, and other audio processing.

Figure 19:
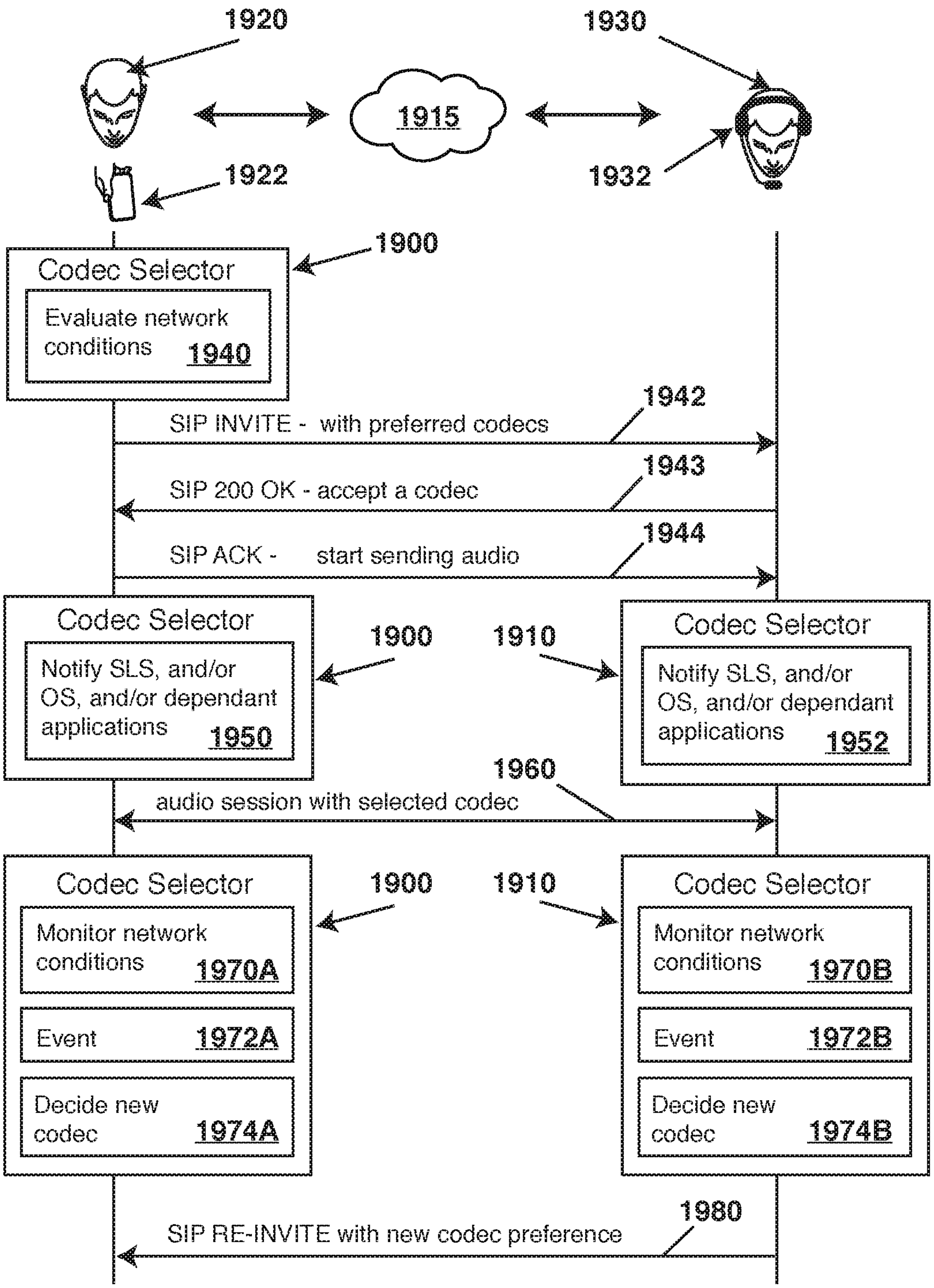
FIG. 19 shows flow of a codec selection between a first codec selector and a second codec selector that communicate with each other over one or more networks in accordance with an example embodiment.

FIG. 19 shows flow of a codec selection between a first codec selector 1900 and a second codec selector 1910 that communicate with each other over one or more networks 1915. For illustration, the codec selection occurs for a voice communication over an Internet Protocol (IP) network when a first user 1920 with a first electronic device 1922 commences a VoIP communication with a second user 1930 with a second electronic device 1932 over the one or more networks 1915.

Flow begins at block 1940 as codec selector 1900 evaluates current network conditions.

As shown at 1942, codec selector 1900 sends codec selector 1910 a Session Initiation Protocol (SIP) invitation (INVITE) in order to establish a media session between the two electronic devices. The invitation includes one or more preferred codecs for the communication (such as sending a preferred or recommended codec).

As shown at 1943, codec selector 1910 accepts the SIP invitation (SIP 200 OK), and transmits this acceptance and the codec selected to codec selector 1900.

As shown at 1944, codec selector 1900 sends a confirmation of reliable message exchange (SIP ACK) to codec selector 1910. The confirmation instructs the codec selector 1910 to start sending audio data for the communication per the agreed codec.

As shown at 1950, codec selector 1900 notifies the SLS and/or the operating system (OS) and/or dependent applications of the active session, the codec in use, and their selected parameters. As shown at 1952, codec selector 1910 notifies the SLS and/or the operating system (OS) and/or dependent applications of the active session, the codec in use, and their selected parameters.

As shown at 1960, the VoIP communication session commences with the accepted or agreed codec.

During the communication, the codec selectors and/or the sound localization system perform tasks. Some example tasks are shown as monitor network conditions 1970A and 1970B, listen for events 1972A and 1972B, and decide if a new or different codec is desired or needed 1974A and 1974B.

For illustration, assume an example in which a new or different codec is desired or needed. As shown at 1980, codec selector 1910 sends codec selector 1900 a re-invitation for a new codec (SIP RE INVITE new codec preference). If the codec selector 1900 acknowledges, then the communication between the two parties 1920 and 1930 continues with the new codec.

In an example embodiment, when a network will not support transmission of data output from the sound localization system in a timely manner, then the data can be compressed before being sent and decompressed when received according to an agreed compression/decompression protocol. For example, Session Description Protocols (SIS/SDP) can be used together with a number of codecs that are suitable for various bandwidth limitations and/or optimized for various types of audio data, such as binaural wide-band, binaural speech, stereo music, 2D stereo speech, single channel speech, and others.

Figure 20:
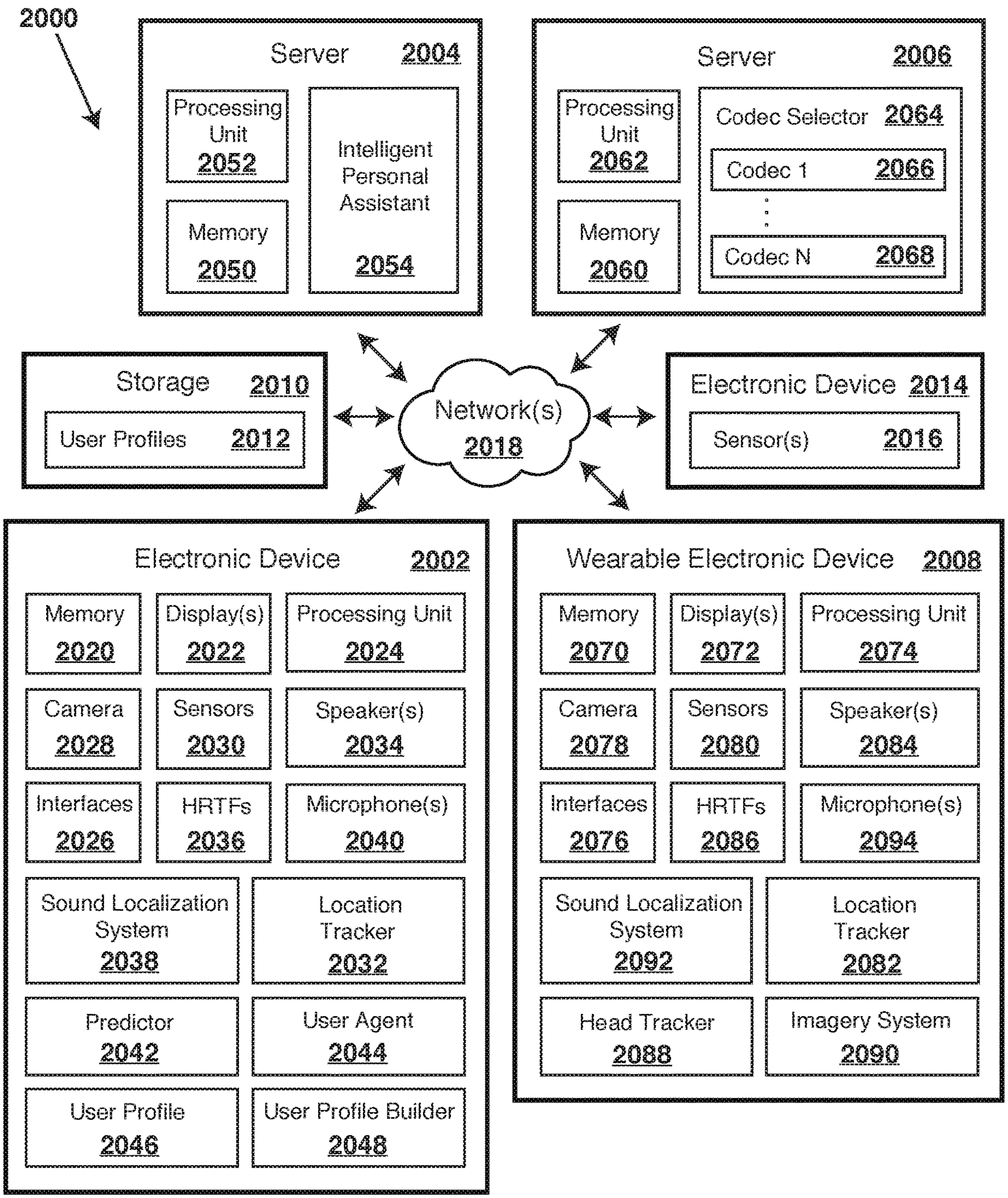
FIG. 20 is a computer system in accordance with an example embodiment.

FIG. 20 is a computer system 2000 that includes an electronic device 2002, a server 2004, a server 2006, a wearable electronic device 2008, storage 2010 with user profiles 2012, and an electronic device 2014 with one or more sensors 2016 in communication with each other over one or more networks 2018.

By way of example, electronic devices include, but are not limited to, a computer, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems.

Electronic device 2002 includes one or more components of computer readable medium (CRM) or memory 2020, one or more displays 2022, a processor or processing unit 2024, one or more interfaces 2026 (such as a network interface, a graphical user interface, a natural language user interface, a natural user interface, a reality user interface, a kinetic user interface, touchless user interface, an augmented reality user interface, and/or an interface that combines reality and VR), a camera 2028, one or more sensors 2030 (such as micro-electro-mechanical systems sensor, an activity tracker, a pedometer, a piezoelectric sensor, a biometric sensor, an optical sensor, radio-frequency identification sensor, a global positioning satellite (GPS) sensor, a solid state compass, gyroscope, magnetometer, and/or an accelerometer), a location or motion tracker 2032, one or more speakers 2034, head related transfer functions or HRTFs 2036, a sound localization system 2038 (such as a system that localizes sound, adjusts sound, moves sound, predicts or extrapolates characteristics of sound, manages SLPs, predicts SLPs, and/or executes one or more methods discussed herein), one or more microphones 2040, a predictor 2042, a user agent 2044 (such as an intelligent user agent), a user profile 2046 (including public and private information about a user), and a user profile builder 2048.

Server 2004 includes computer readable medium (CRM) or memory 2050, a processor or processing unit 2052, and an intelligent personal assistant 2054.

By way of example, the intelligent personal assistant 2054 is a software agent that performs tasks or services for a person, such as organizing and maintaining information (emails, calendar events, files, to-do items, etc.), responding to queries, performing specific one-time tasks (such as responding to a voice instruction), performing ongoing tasks (such as schedule management and personal health management), and providing recommendations. By way of example, these tasks or services can be based on one or more of user input, prediction, activity awareness, location awareness, an ability to access information (including user profile information and online information), user profile information, and other data or information.

Server 2006 includes computer readable medium (CRM) or memory 2060, processor or processing unit 2062, and codec selector 2064 with a plurality of codecs (shown as codec 1 (2066) to codec N (2068)). The codec selector 2064 selects one or more of the codecs based on or in response to an event or information, such as sensed information, network information, system information, information from a sound localization system, and other information or data discussed herein.

Wearable electronic device 2008 includes computer readable medium (CRM) or memory 2070, one or more displays 2072, a processor or processing unit 2074, one or more interfaces 2076 (such as an interface discussed herein), a camera 2078, one or more sensors 2080 (such as a sensor discussed herein), a motion or location tracker 2082, one or more speakers 2084, HRTFs 2086, a head tracking system or head tracker 2088, an imagery system 2090, a sound localization system 2092, and one or more microphones 2094.

By way of example, the imagery system 2090 includes, but is not limited to, one or more of an optical projection system, a virtual image display system, virtual augmented reality system, and/or a spatial augmented reality system. By way of example, the virtual augmented reality system uses one or more of image registration, computer vision, and/or video tracking to supplement and/or change real objects and/or a view of the physical, real world.

By way of example, the location or motion tracker includes, but is not limited to, a wireless electromagnet motion tracker, a system using active markers or passive markers, a markerless motion capture system, video tracking (e.g. using a camera), a laser, an inertial motion capture system and/or inertial sensors, facial motion capture, a radio frequency system, an infrared motion capture system, an optical motion tracking system, an electronic tagging system, a GPS tracking system, a compass, and an object recognition system (such as using edge detection).

Consider an example in which a user wears or has an activity tracker or motion sensor (such as a device that monitors, tracks, and/or measures fitness-related metrics like distance walked, calories burned, rate of walking or running, etc.). The activity tracker or motion sensor detects when a person commences to walk quickly or run. When this event occurs, the computer system or electronic device changes or switches binaural sound.

Consider an example in which Alice is walking with electronic earphones or headphones while talking to her intelligent user agent that localizes out in front of Alice as she walks. Suddenly, Alice begins to run. Her headphones do not include head tracking so localization of the intelligent personal assistant changes from localizing externally to Alice to localizing internally to Alice in order to prevent her from experiencing the SLP as one that swings with her gait and head movement.

The event predictor or predictor 2042 predicts or estimates events including, but not limited to, switching or changing between binaural and stereo sounds at a future time, changing or altering binaural sound (such as moving a SLP, reducing a number of SLPs, eliminating a SLP, adding a SLP, starting transmission or emission of binaural sound, stopping transmission or emission of binaural sound, etc.), predicting an action of a user, predicting a location of a user, predicting an event, predicting a desire or want of a user, predicting a query of user (such as a query to an intelligent personal assistant), etc. The predictor can also predict user actions or requests in the future (such as a likelihood that the user or electronic device requests a switch between binaural and stereo sounds or a change to binaural sound). For instance, determinations by a software application, an electronic device, and/or the user agent can be modeled as a prediction that the user will take an action and/or desire or benefit from a switch between binaural and stereo sounds or a change to binaural sound (such as pausing binaural sound, muting binaural sound, reducing or eliminating one or more cues or spatializations or localizations of binaural sound). For example, an analysis of historic events, personal information, geographic location, and/or the user profile provides a probability and/or likelihood that the user will take an action (such as whether the user prefers binaural sound or stereo sound for a particular location, a particular listening experience, or a particular communication with another person or an intelligent personal assistant). By way of example, one or more predictive models are used to predict the probability that a user would take, determine, or desire the action.

The predictive models can use one or more classifiers to determine these probabilities. Example models and/or classifiers include, but are not limited to, a Naive Bayes classifier (including classifiers that apply Bayes' theorem), k-nearest neighbor algorithm (k-NN, including classifying objects based on a closeness to training examples in feature space), statistics (including the collection, organization, and analysis of data), collaborative filtering, support vector machine (SVM, including supervised learning models that analyze data and recognize patterns in data), data mining (including discovery of patterns in data-sets), artificial intelligence (including systems that use intelligent agents to perceive environments and take action based on the perceptions), machine learning (including systems that learn from data), pattern recognition (including classification, regression, sequence labeling, speech tagging, and parsing), knowledge discovery (including the creation and analysis of data from databases and unstructured data sources), logistic regression (including generation of predictions using continuous and/or discrete variables), group method of data handling (GMDH, including inductive algorithms that model multi-parameter data) and uplift modeling (including analyzing and modeling changes in probability due to an action).

Consider an example in which the predictor tracks and stores event data over a period of time, such as days, weeks, months, or years for users of binaural sound. This event data includes recording and analyzing patterns of actions with the binaural sound and motions of an electronic device (such as an HPED or electronic earphones). Based on this historic information, the predictor predicts what action a particular user will take with an electronic device (e.g., whether the user will accept or place a voice call in binaural sound or stereo sound and with whom and at what time and locations, whether the user will communicate with an intelligent personal assistant in binaural sound or stereo sound at what times and locations and for what durations, whether the user will listen to music in binaural sound or stereo sound and from which sources, where the user will take the electronic device, in what orientation it will be carried, the travel time to the destination and the route to get there, in what direction a user will walk or turn or orient his/her head or gaze, what mood or emotion a user is experiencing, etc.).

Consider an example in which a user travels to a new country and receives a telephone call from a friend while in a library. Although the user is legally allowed to localize the voice of the friend to a SLP that is adjacent to the user, locals frown upon localizing calls in this manner since it is considered rude or disrupting while in a library. The user is unaware of this fact, but an intelligent user agent of the user executes a predictor before taking the call and determines, based on a collaborative filtering technique, that localizing the call in the library is rarely performed relative to the times it is denied by users under similar circumstances. As such, the call originates in stereo sound in the earphones of the user. When the user attempts to localize the voice of the friend to a SLP away from the user, the intelligent user agent notifies the user that such localization is not recommended since it is likely contrary to local habits or customs.

One or more electronic devices can also monitor and collect data with respect to the person and/or electronic devices, such as electronic devices that the person interacts with and/or owns. By way of example, this data includes user behavior on an electronic device, installed client hardware, installed client software, locally stored client files, information obtained or generated from the user's interaction with a network (such as web pages on the internet), email, peripheral devices, servers, other electronic devices, programs that are executing, SLP locations, SLP preferences, binaural sound preferences, music listening preferences, time of day and period of use, sensor readings (such as common gaze angles and patterns of gaze at certain locations such as a work desk or home armchair, common device orientations and cyclical patterns of orientation such as one gathered while a device is in a pocket or on a head), etc. The electronic devices collect user behavior on or with respect to an electronic device (such as the user's computer), information about the user, information about the user's computer, and/or information about the computer's and/or user's interaction with the network.

By way of example, a user agent and/or user profile builder monitors user activities and collects information used to create a user profile, and this user profile includes public and private information. The profile builder monitors the user's interactions with one or more electronic devices, the user's interactions with other software applications executing on electronic devices, activities performed by the user on external or peripheral electronic devices, etc. The profile builder collects both content information and context information for the monitored user activities and then stores this information. By way of further illustration, the content information includes contents of web pages and internet links accessed by the user, people called, subjects spoken of, locations called, questions or tasks asked of an IPA, graphical information, audio/video information, patterns in head tracking, device orientation, location, physical and virtual positions of conversations, searches or queries performed by the user, items purchased, likes/dislikes of the user, advertisements viewed or clicked, information on commercial or financial transactions, videos watched, music played, interactions between the user and a user interface (UI) of an electronic device, commands (such as voice and typed commands), information relating to SLPs and binaural sound, etc.

The user profile builder also gathers and stores information related to the context in which the user performed activities associated with an electronic device. By way of example, such context information includes, but is not limited to, an order, frequency, duration, and time of day in which the user accessed web pages, audio streams, SLPs, information regarding the user's response to interactive advertisements, calls, requests and notifications from intelligent personal assistants (IPAs), information as to when or where a user localized binaural sounds, switched to or from binaural sound sending or receiving, etc.

As previously stated, the user profile builder also collects content and context information associated with the user interactions with various different applications executing on one or more electronic devices. For example, the user profile builder monitors and gathers data on the user's interactions with a telephony application, an AAR application, web browser, an electronic mail (email) application, a word processor application, a spreadsheet application, a database application, a cloud software application, a sound localization system (SLS), and/or any other software application executing on an electronic device.

Consider an example in which a user agent and/or electronic device gathers SLP preferences while the user communicates during a voice exchange with an intelligent user agent, an intelligent personal assistant, or another person during a communication over the Internet. For example, a facial and emotional recognition system determines facial and body gestures of a user while the user communicates during the voice exchange. For instance, this system can utilize Principal Component Analysis with Eigenfaces, Linear Discriminate Analysis, 3D facial imaging techniques, emotion classification algorithms, Bayesian Reasoning, Support Vector Machines, K-Nearest Neighbor, neural networks, or a Hidden Markov Model. A machine learning classifier can be used to recognize an emotion of the user.

By way of example, SLP preferences can include a person's personal likes and dislikes, opinions, traits, recommendations, priorities, tastes, subjective information, etc. with regard to SLPs and binaural sound. For instance, the preferences include a desired or preferred location for a SLP during a voice exchange, a desired or preferred time when to localize sound versus not localize sound, permissions that grant or deny people rights to localize to a SLP that is away from but proximate to a person during a voice exchange (such as a VoIP call), a size and/or shape of a SLP, a length of time that sound localizes to a SLP, a priority of a SLP, a number of SLPs that simultaneously localize to a person, etc. Consider an example in which a HPED has a mobile operating system that includes a computer program that functions as an intelligent personal assistant (IPA) and knowledge navigator. The IPA uses a natural language user interface to interact with a user, answer questions, perform services, make recommendations, and communicates with a database and web services to assist the user. The IPA further includes or communicates with a predictor and/or user profile to provides its user with individualized searches and functions specific to and based on preferences of the user. A conversational interface (e.g., using as a natural language interface using voice recognition and machine learning), personal context awareness (e.g., using user profile data to adapt to individual preferences with personalized results), and service delegation (e.g., providing access to built-in applications in the HPED) enable the IPA to interact with its user and perform switching functions discussed herein. For example, the IPA predicts and/or intelligently performs switching to binaural sound, switching from binaural sound, altering binaural sound, and executing other methods discussed herein.

Consider an example in which a HPED has a mobile operating system with a computer program that functions as an intelligent personal assistant (IPA) and knowledge navigator. The IPA uses a natural language user interface to interact with a user, answer questions, perform services, make recommendations, and communicate with a database and web services to assist the user. The IPA further includes or communicates with a predictor and/or user profile to provide its user with individualized searches and functions specific to and based on preferences of the user. A conversational interface (e.g., using a natural language interface with voice recognition and machine learning), personal context awareness (e.g., using user profile data to adapt to individual preferences and provide personalized results), and service delegation (e.g., providing access to built-in applications in the HPED) enable the IPA to interact with its user and perform switching functions discussed herein. For example, the IPA predicts and/or intelligently performs switching to binaural sound, switching from binaural sound, altering binaural sound, and executing other methods discussed herein.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

As used herein, a "user" can be a human being, an intelligent personal assistant (IPA), a user agent (including an intelligent user agent and a machine learning agent), a process, a computer system, a server, a software program, hardware, an avatar, or an electronic device. A user can also have a name, such as Alice, Bob, and Charlie, as described in some example embodiments.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

As used herein, a "user profile" is personal data that represents an identity of a specific person or organization. The user profile includes information pertaining to the characteristics and/or preferences of the user. Examples of this information for a person include, but are not limited to, one or more of personal data of the user (such as age, gender, race, ethnicity, religion, hobbies, interests, income, employment, education, location, communication hardware and software used including peripheral devices such as head tracking systems, abilities, disabilities, biometric data, physical measurements of their body and environments, functions of physical data such as HRTFs, etc.), photographs (such as photos of the user, family, friends, and/or colleagues, their head and ears), videos (such as videos of the user, family, friends, and/or colleagues), and user-specific data that defines the user's interaction with and/or content on an electronic device (such as display settings, audio settings, application settings, network settings, stored files, downloads/uploads, browser and calling activity, software applications, user interface or GUI activities, and/or privileges).

Examples herein can take place in physical spaces, in computer rendered spaces (VR), in partially computer rendered spaces (AR), and in combinations thereof.

FIGS. 17-20 show example computers and electronic devices with various components. One or more of these components can be distributed or included in various electronic devices, such as some components being included in an HPED, some components being included in a server, some components being included in storage accessible over the Internet, some components being in an imagery system, some components being in wearable electronic devices, and some components being in various different electronic devices that are spread across a network or a cloud, etc.

The processor unit includes a processor (such as a central processing unit, CPU, microprocessor, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit communicates with memory and performs operations and tasks that implement one or more blocks of the flow diagrams discussed herein. The memory, for example, stores applications, data, programs, algorithms (including software to implement or assist in implementing example embodiments) and other data.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip)) designed with special functionality to execute functions of the SLS.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS.

Consider an example in which the SLS or portions of the SLS include one or more integrated circuits that are specifically customized, designed, or configured to execute one or more blocks discussed herein.

Example embodiments also include embodiments discussed in U.S. application having Ser. No. 14/311,532, filed 23 Jun. 2014, issued as U.S. Pat. No. 9,226,090, entitled "Sound Localization for an Electronic Call" and being incorporated herein by reference.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A wearable electronic device (WED) worn on a head of a listener, the WED comprising:

a display that displays, during an electronic communication with people, virtual images of the people that appear in an area where the listener is physically located;

speakers that play binaural sound that externally localizes to the virtual images of the people that appear in the area where the listener is physically located;

one or more sensors that sense when a person enters the area where the listener is physically located; and one or more microphones that detect a voice of the person that enters the area where the listener is physically located;

wherein the WED lowers a volume of the binaural sound playing to the listener in response to the one or more microphones detecting the voice of the person, wherein the WED lowers the volume of the binaural sound playing to the listener in response to the one or more sensors sensing the person enters the area where the listener is physically located, and wherein the WED switches head-related transfer functions (HRTFs) processing voices of the people during the electronic communication in response to the one or more sensors sensing the person enters the area where the listener is physically located.

2. The WED of claim 1, wherein the WED moves a sound localization point (SLP) of a voice of one of the people in the electronic communication being played to the listener in response to the one or more sensors sensing when the person enters the area where the listener is physically located.

3. The WED of claim 1, wherein the WED moves a sound localization point (SLP) of a voice of one of the people in the electronic communication being played to the listener in response to the one or more sensors sensing when the person moves to be within a predetermined distance from the listener.

4. The WED of claim 1, wherein WED switches the binaural sound playing to one of stereo sound or mono sound in response to the one or more microphones detecting the voice of the person.

5. The WED of claim 1, wherein WED switches the binaural sound playing to one of stereo sound or mono sound in response to the one or more sensors sensing the person enters the area where the listener is physically located.

6. The WED of claim 1, wherein the one or more sensors sense when the person walks into a room where the listener is physically located, and the WED lowers volumes of voices of the people in the electronic communication playing to the listener through the speakers in response to the one or more sensors sensing when the person walks into the room.

7. A wearable electronic device (WED) worn on a head of a listener, the WED comprising:

a display that displays, during an electronic communication with a user, a virtual image of the user that appears in an area where the listener is physically located; and one or more sensors that sense, during the electronic communication with the user, when a person moves to be within a predetermined distance from the listener wearing the WED, wherein the WED lowers, during the electronic communication with the user, a volume of a voice of the user being played to the listener as binaural sound in response to the one or more sensors sensing when the person moves to be within the predetermined distance from the listener, and wherein the WED moves a sound localization point (SLP) of the voice of the user being played to the listener as the binaural sound in response to the one or more sensors sensing when the person moves to be within the predetermined distance from the listener.

8. The WED of claim 7 further comprising:

one or more microphones that detect a voice of the person, wherein the WED lowers, during the electronic communication with the user, the volume of the voice of the user being played to the listener as the binaural sound in response to the one or more microphones detecting the voice of the person.

9. The WED of claim 7 further comprising:

one or more microphones that receive, from the listener and during the electronic communication with the user, a voice command to an intelligent personal assistant (IPA), wherein the WED moves a sound localization point (SLP) of the voice of the user closer to the listener in response to the one or more microphones receiving the voice command from the listener to the IPA to move the SLP closer to the listener.

10. The WED of claim 7 further comprising:

a switch that when activated by the listener causes the WED to switch the voice of the user being played to the listener as the binaural sound to being played to the listener as one of stereo sound or mono sound.

11. The WED of claim 7, wherein the WED switches from a silent mode that blocks environmental sound from passing through to the listener to a mix-mode that allows the environmental sound to pass through to the listener in response to the one or more sensors sensing when the person moves to be within the predetermined distance from the listener.

12. The WED of claim 7 further comprising:

one or more microphones that detect a voice of the person, wherein the WED switches from a silent mode that blocks environmental sound to pass through to the listener to a mix-mode that allows the environmental sound to pass through to the listener in response to the one or more microphones detecting the voice of the person.

13. The WED of claim 7 further comprising:

a sensor that senses a hand of the listener touching the WED, wherein the WED switches the voice of the user being played to the listener as the binaural sound to being played to the listener as one of stereo sound or mono sound in response to the sensor sensing the hand of the listener touching the WED.

14. The WED of claim 7 further comprising:

one or more cameras that determine a location of the listener wearing the WED, wherein the WED switches the voice of the user being played to the listener as the binaural sound to being played to the listener as one of stereo sound or mono sound in response to determining the location of the listener changes.

15. A method, comprising:

displaying, with a display of a wearable electronic device (WED) worn on a head of a listener, a virtual image of a user during an electronic communication between the listener and the user;

sensing, with one or more sensors in the WED worn on the head of the listener during the electronic communication, when a person enters an area where the listener is located;

lowering, during the electronic communication with the user, a volume of a voice of the user that plays to the listener in binaural sound in response to sensing when the person enters the area where the listener is located;

sensing, with one or more sensors in the WED, a physical activity of the listener wearing the WED; and switching the binaural sound playing to the listener to one of stereo sound or mono sound in response to the sensing of the physical activity of the listener wearing the WED.

16. The method of claim 15 further comprising:

detecting, with one or more microphones in the WED, a voice of the person; and lowering, during the electronic communication with the user, the volume of the voice of the user that plays to the listener in the binaural sound in response to the one or more microphones detecting the voice of the person.

17. The method of claim 15 further comprising:

detecting, with one or more microphones in the WED, a voice of the person; and displaying, with the display of the WED during the electronic communication with the user, a visual warning in response to the one or more microphones detecting the voice of the person.

* * * * *